United States Patent
Mueller-Rentz et al.

(10) Patent No.: US 11,131,840 B2
(45) Date of Patent: Sep. 28, 2021

(54) MICROSCOPE SYSTEM AND METHOD FOR MICROSCOPIC IMAGING

(71) Applicant: Leica Microsystems CMS GmbH, Wetzlar (DE)

(72) Inventors: Arnold Mueller-Rentz, Brechen (DE); Christian Schulz, Solms-Albshausen (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/768,900

(22) PCT Filed: Nov. 27, 2018

(86) PCT No.: PCT/EP2018/082654
§ 371 (c)(1),
(2) Date: Jun. 2, 2020

(87) PCT Pub. No.: WO2019/110368
PCT Pub. Date: Jun. 13, 2019

(65) Prior Publication Data
US 2021/0165198 A1   Jun. 3, 2021

(30) Foreign Application Priority Data

Dec. 4, 2017   (DE) .................... 10 2017 128 776.0
Dec. 4, 2017   (DE) .................... 10 2017 128 777.9
(Continued)

(51) Int. Cl.
*G02B 21/00*   (2006.01)
*G02B 21/08*   (2006.01)
(Continued)

(52) U.S. Cl.
CPC ....... *G02B 21/0064* (2013.01); *G02B 21/008* (2013.01); *G02B 27/1013* (2013.01);
(Continued)

(58) Field of Classification Search
None
See application file for complete search history.

(56) References Cited

U.S. PATENT DOCUMENTS 3,659,918 A   5/1972   Tan
3,718,752 A   2/1973   Katsuta et al.
(Continued)

FOREIGN PATENT DOCUMENTS

DE   2063049 A    7/1971
DE   2446923 A1   4/1975
(Continued)

OTHER PUBLICATIONS

Toomre, D. und Pawley, J.B., "Disk-Scanning Confocal Microscopy," chapter 10 in Pawley, J.B. (editor), Handbook of Biological Confocal Microscopy, 3rd edition, Springer-Verlag, Dec. 2006.
(Continued)

*Primary Examiner* — Patricia I Young
(74) *Attorney, Agent, or Firm* — Leydig, Voit & Mayer, Ltd.

(57) ABSTRACT

A microscope system includes a detection unit having a color beam splitter arrangement with three beam splitter prisms, each having first, second and third prism surfaces. The first prism surfaces face in the same direction and are oriented parallel to one another at a right angle to an optical axis. The first and second prism surfaces are oriented in each case at acute angles to one another. The second and third prism surfaces are oriented in each case at right or obtuse angles to one another. The third and first prism surfaces are oriented in each case at acute angles to one another. A
(Continued)

prismatic compensation element having first and second prism surfaces is assigned to each prism. The second prism surface of each of the compensation elements is arranged in a common plane with or parallel to the second prism surface of the respectively assigned prism.

26 Claims, 5 Drawing Sheets

(30) Foreign Application Priority Data

Dec. 4, 2017 (DE) ...................... 10 2017 128 778.7
Sep. 28, 2018 (DE) ...................... 10 2018 124 129.1

(51) Int. Cl.
| | |
|---|---|
| *G02B 21/18* | (2006.01) |
| *G02B 21/36* | (2006.01) |
| *G02B 27/10* | (2006.01) |
| *G02B 27/14* | (2006.01) |
| *H04N 5/00* | (2011.01) |
| *H04N 5/225* | (2006.01) |
| *H04N 5/235* | (2006.01) |

(52) U.S. Cl.
CPC ......... *G02B 27/145* (2013.01); *H04N 5/2256* (2013.01); *H04N 5/2351* (2013.01); *H04N 5/2354* (2013.01)

(56) References Cited

U.S. PATENT DOCUMENTS

| | | |
|---|---|---|
| 4,084,180 A | 4/1978 | Stoffels et al. |
| 5,777,674 A | 7/1998 | Ohmuro |
| 8,988,564 B2 | 3/2015 | Webster et al. |
| 2009/0103801 A1 | 4/2009 | Messler |
| 2009/0323192 A1 | 12/2009 | Towndrow et al. |
| 2015/0160451 A1 | 6/2015 | Staker et al. |
| 2017/0199362 A1 | 7/2017 | Schwedt et al. |
| 2018/0149851 A1 | 5/2018 | Knebel et al. |
| 2018/0180864 A1 | 6/2018 | Knebel et al. |
| 2019/0162976 A1 | 5/2019 | Sondermann et al. |

FOREIGN PATENT DOCUMENTS

| | | |
|---|---|---|
| DE | 102005022880 A1 | 11/2006 |
| DE | 102005062673 A1 | 7/2007 |
| DE | 102007053074 A1 | 5/2009 |
| DE | 102008062791 A1 | 7/2010 |
| DE | 102014107606 A1 | 12/2015 |
| DE | 102016102209 A1 | 8/2017 |
| DE | 202018103032 U1 | 6/2018 |
| EP | 0291091 A2 | 11/1988 |
| WO | 2016/166374 A1 | 10/2016 |
| WO | 2016/166375 A1 | 10/2016 |
| WO | 2017/043000 A1 | 3/2017 |
| WO | 2017/174225 A1 | 10/2017 |

OTHER PUBLICATIONS

Stelzer, E.H.K., "The Intermediate Optical System of Laser-Scanning Confocal Microscopes," chapter 9 in Pawley, J.B. (editor), Handbook of Biological Confocal Microscopy, 3rd edition, Springer-Verlag, Dec. 2006.

MICROSCOPE SYSTEM AND METHOD FOR MICROSCOPIC IMAGING

CROSS-REFERENCE TO PRIOR APPLICATIONS

This application is a U.S. National Phase Application under 35 U.S.C. § 371 of International Application No. PCT/EP2018/082654, filed on Nov. 27, 2018, and claims benefit to German Patent Application Nos. DE 10 2017 128 776.0, filed on Dec. 4, 2017, DE 10 2017 128 777.9, filed on Dec. 4, 2017, DE 10 2017 128 778.7, filed on Dec. 4, 2017, and DE 10 2018 124 129.1, filed on Sep. 28, 2018. The International Application was published in German on Jun. 13, 2019 as WO 2019/110368 under PCT Article 21(2).

FIELD

The present invention relates to a microscope system having a first detection unit or having a plurality of detection units comprising a first and at least one second detection unit, in particular a combined wide-field and confocal microscope system, and to a method for microscopic imaging by means of a corresponding microscope system.

BACKGROUND

Color-selective detection is of great importance for microscopy, in particular fluorescence microscopy, since in this case a plurality of dyes are often used simultaneously in a sample. For color-selective detection in fluorescence microscopy and in microscopy generally, a plurality of different methods and devices are known from the prior art. In principle, it is possible to differentiate between sequential and simultaneous or parallel detection of a plurality of colors or fluorophores. Even though reference is made predominantly to fluorescence microscopy hereinafter, the corresponding explanations also apply to other microscopic examination methods. The following explanations furthermore apply to wide-field and confocal microscope systems in the same way.

For sequential detection, it is possible to use monochrome cameras, for example. In order to ensure that the latter detect only one fluorescence channel in each case, the fluorescent dye to be detected in each case is selected for example by a respectively appropriate single-band fluorescence splitter cube being switched into the reflected-light axial plane of the microscope. The correct combination of excitation and emission wavelength ranges in each case can be ensured in this way. However, a change between different excitation and detection modalities is comparatively slow in this case. The switchover time between the respective emission wavelength ranges is typically approximately 300 to 400 ms, which often proves not to be fast enough particularly for the examination of movable objects such as, in particular, living cells.

In order to enable faster detection using a single monochrome camera, it is also possible to use a multiband fluorescence splitter cube, which allows all pertinent excitation wavelength ranges to reach the sample and accordingly all pertinent emission wavelength ranges to reach the camera. In this case, the fluorescent dye respectively detected can be selected by way of a rapidly switchable emission filter wheel between microscope and camera. At the same time, the excitation is appropriately selected by way of a likewise rapidly switchable excitation filter wheel or a rapidly modulatable light source (e.g. LED). Corresponding methods and devices continue to exhibit the disadvantage of their switching time between the different excitation and detection modalities, which is still not fast enough in some instances, particularly in living cell experiments.

For simultaneous detection, it is also possible to use color cameras having Bayer or Foveon sensors. In this case, it is possible to use a multiband fluorescence splitter cube, which, as in the case of fast sequential detection just described, allows all pertinent excitation wavelength ranges to reach the sample and all pertinent emission wavelength ranges to reach the camera. The color capability of the camera permits the detection of the different emission wavelength ranges in different color channels. However, the disadvantage of corresponding methods and devices is the low detection efficiency, since each camera pixel can detect only part of the observation light impinging in a corresponding region: in the case of a Bayer sensor, in which a checkered color mask is used, it is the nature thereof that only a certain part of the sensor area crucial for the total sensitivity is available in each case for the detection of each individual color. Regardless of the theoretically higher sensitivity of a Foveon sensor owing to the lack of a color mask, said sensor often affords no advantages in practice.

For simultaneous detection, it is also possible to use single monochrome cameras. As before, in this case it is possible to use a multiband fluorescence splitter cube, which allows all pertinent excitation wavelength ranges to reach the sample and all pertinent emission wavelength ranges to reach the camera. However, an optical intermediate module is arranged between microscope and camera and reduces and spectrally splits the intermediate image of the microscope, such that a plurality of copies of the intermediate image in different spectral ranges are imaged onto the camera sensor next to one another. Changeable, dichroic splitter plates are often used for spectral splitting in arrangements of this type.

Finally, it is also possible to use a plurality of monochrome cameras for fluorescence detection. It is possible once again to use a multiband fluorescence splitter cube, which allows all pertinent excitation wavelength ranges to reach the sample and all pertinent emission wavelength ranges to reach the cameras. Here, an optical intermediate module is arranged between microscope and camera and spectrally splits the intermediate image of the microscope, such that different spectral ranges are imaged onto different cameras. Changeable, dichroic splitter plates or corresponding splitter layers can be used here as well.

Methods and devices of the type just described are known, inter alia, from WO 2016/166374 A1 and WO 2016/166375 A1 in the name of the present applicant. Generally, for spectrally splitting the intermediate image in corresponding methods and arrangements it is possible to use color beam splitter arrangements, which have been known for some time in particular from the field of color television technology, but which may have specific disadvantages in each case, particularly in microscopy.

In this regard, by way of example, a so-called Philips prism, as described in U.S. Pat. Nos. 3,659,918 A and 4,084,180 A for use for a color television camera, results in a comparatively long optical path distance in glass. Furthermore, the light can be split only into three channels by means of a Philips prism. A further disadvantage becomes apparent when consideration is given to FIG. 1 of U.S. Pat. No. 4,084,180 A, to which the reference signs used in this paragraph refer and to which reference is expressly made here. Whereas here the ray r1 can be subjected to total internal reflection at the base surface of the prism A after reflection at the layer 2 and a reflective coating is thus not necessary in the ideal case, the interface for transmission from A to B must initially be transmissive for ray r2, but then have a reflective effect for the light reflected at the layer 1. A corresponding coating may therefore possibly result in considerable light losses on account of scattering.

A color beam splitter known from US 2009/0323192 A1 can result in problems in respect of structural space owing to its size and likewise has the disadvantage of long glass paths. Production and alignment are complex and expensive owing to the multiplicity of optical elements used. The multiplicity of interfaces can likewise result in light losses and scattering.

DE 10 2008 062 791 A1 furthermore discloses a microscope having a beam splitter cube (a so-called X-Cube) comprising a total of four prisms. A corresponding arrangement for a camera is also disclosed in U.S. Pat. No. 8,988,564 B2, for example. However, the deflection effected at 45° in the beam splitter cube is very greatly dependent on polarization and thus disadvantageous. Moreover, the positioning of prism edges in the beam path can result in scattering and light losses.

Other color beam splitter devices known from the prior art require further complex components such as a relay optical unit, for example, or are unsuitable or disadvantageous for use in microscopy in particular for structural or optical reasons.

SUMMARY

In an embodiment, the present invention provides a microscope system having a first detection unit, or a plurality of detection units comprising the first detection unit and at least one second detection unit. The first detection unit or at least one of the plurality of detection units has a color beam splitter arrangement having three beam splitter prisms. Each of the beam splitter prisms have a first, a second and a third prism surface, and a dichroic layer disposed on or parallel to each of the second prism surfaces of the beam splitter prisms. The first prism surfaces of the beam splitter prisms face in the same direction and are oriented parallel to one another at a right angle to an optical axis through the first and second prism surfaces of the beam splitter prisms. The first and second prism surfaces of the beam splitter prisms are oriented in each case at acute first angles to one another. The second and third prism surfaces of the beam splitter prisms are oriented in each case at right or obtuse second angles to one another. The third and first prism surfaces of the beam splitter prisms are oriented in each case at acute third angles to one another. A prismatic compensation element having a first prism surface and a second prism surface is assigned to each of the beam splitter prisms. The second prism surface of each of the compensation elements is arranged in a common plane with or parallel to the second prism surface of the respectively assigned beam splitter prism.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

Figure 1:
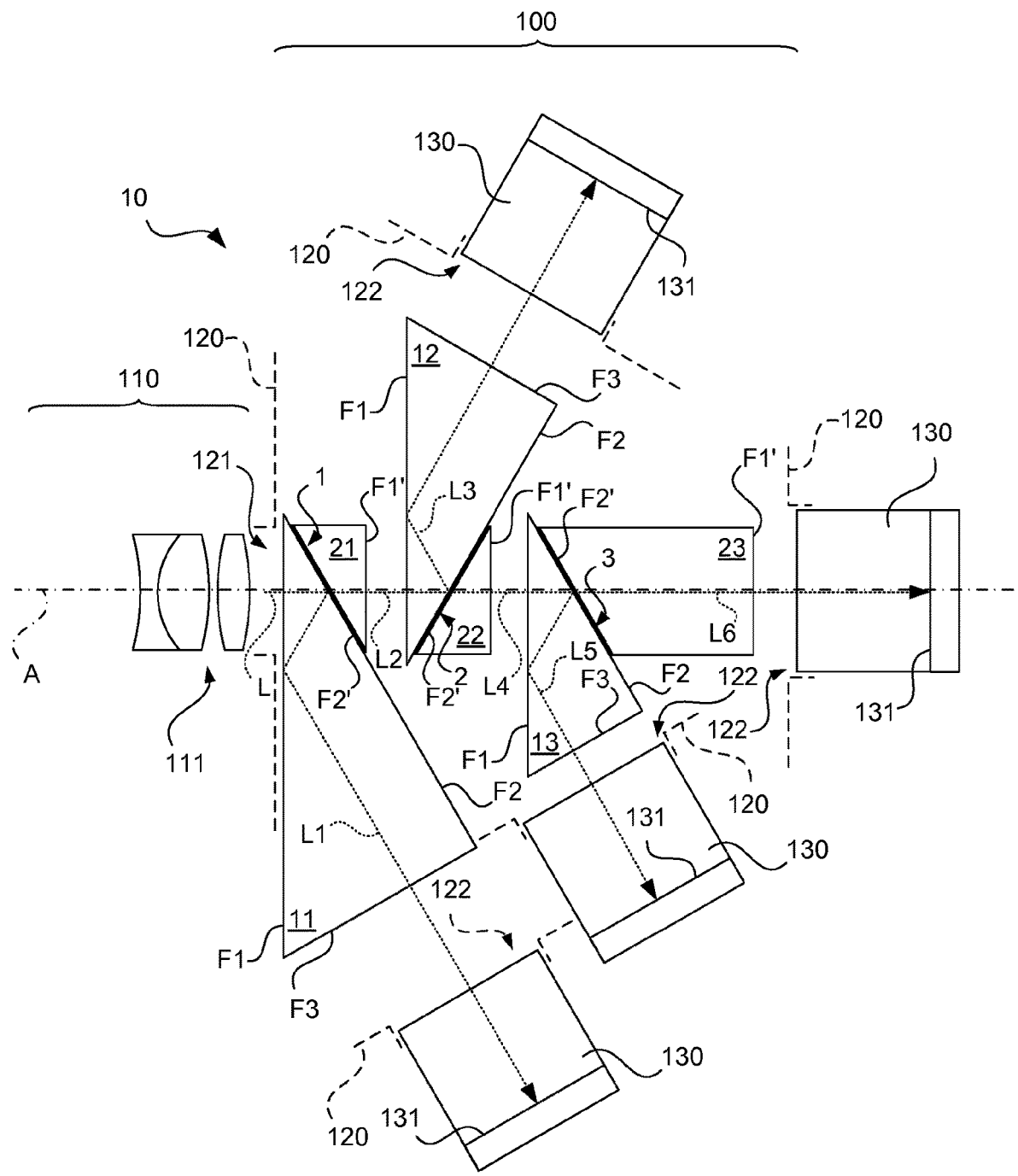
FIG. 1 illustrates a detection unit for a microscope system in accordance with one embodiment of the invention in a greatly simplified schematic partial illustration.

In the figures, elements that correspond to one another structurally or functionally are at least partly indicated by identical reference signs and in this case will not be explained repeatedly, for reasons of clarity. Insofar as reference is made hereinafter to devices, for example a color beam splitter arrangement, the corresponding explanations apply in the same way to methods carried out by means of these devices.

DETAILED DESCRIPTION

Embodiments of the present invention enable a plurality of fluorophores to be recorded simultaneously, multispectrally and largely without any losses in a microscope. In particular, embodiments of the present invention provide a microscope system having an improved color beam splitter arrangement, and a corresponding method.

Embodiments of the present invention provide a microscope system and a method for microscopic imaging using a microscope system of this type.

The microscope system according to an embodiment of the present invention comprises a first detection unit or a plurality of detection units comprising a first detection unit and at least one second detection unit. A corresponding detection unit can be embodied in particular as a multi-detector module or as part of a multi-detector module having a plurality of detectors for parallel detection. In this case, a corresponding multi-detector module comprises, in particular, an optical adapter, which is able to be attached to a detection output of a microscope, and also a plurality of outputs for coupling a plurality of detectors, or the corresponding detectors themselves. The multi-detector module can for example be coupled to monochrome cameras or other detectors or be configured structurally for a corresponding coupling. It is also possible to provide a plurality of mechanical-optical interfaces for releasable coupling, in particular without tools, to corresponding cameras. As will also be explained below, the terms "sensor", "camera" and "detector" are used largely synonymously here. Since the present invention can be used equally in association with wide-field microscope systems and confocal microscope systems or a combined wide-field and confocal microscope system is provided in one configuration of the present invention, corresponding detectors can be cameras that enable two-dimensional detection in an image plane, that is to say area detectors, but also one-dimensional detectors that measure only an intensity of the respectively incident light beam, that is to say point detectors.

Observation light of the microscope is spectrally split by way of prisms in the color beam splitter arrangement, said prisms being explained in detail below, wherein three prisms, referred to hereinafter as beam splitter prisms, having dichroic layers or coatings having mutually different spectral selectivities, are in each case provided in a color beam splitter arrangement.

The abovementioned adapter can be embodied, in particular, in such a way that it magnifies the intermediate image of the microscope to an extent such that said intermediate image at least largely corresponds to the sensor size of the cameras used if cameras are used as detectors. Said adapter has, in particular, a back focal length of sufficient magnitude to be able to incorporate the color beam splitter arrangement between adapter and camera. If magnification adaptation is not required, the adapter can also consist merely of a purely mechanical element for maintaining the correct distance with respect to the cameras.

An embodiment of the present invention provides a microscope system having a first detection unit or having a plurality of detection units comprising a first and at least one second detection unit. By way of example, exactly two detection units, namely the first detection unit and a second detection unit, can be provided. The first detection unit or at least one of the plurality of detection units has a color beam splitter arrangement having three beam splitter prisms arranged one behind another. It goes without saying that further detection units can be present, which need not have corresponding color beam splitter arrangements.

Insofar as a "color beam splitter arrangement" is mentioned hereinafter, this should be understood to mean a color beam splitter arrangement that is part of a detection unit of a microscope system according to an embodiment of the invention. In other words, the explanations given below concerning a color beam splitter arrangement of this type apply to the microscope system according to an embodiment of the invention or the detection unit or detection units thereof in the same way.

The plurality of beam splitter prisms, the number of which is three according to an embodiment of the invention, have in each case a first, a second and a third prism surface. It goes without saying that even further beam splitter prisms and other prisms without beam splitter properties can be present besides the three beam splitter prisms explained in detail below.

In the context of an embodiment of the present invention, provision is made of one dichroic layer per beam splitter prism, wherein a dichroic layer is provided on or parallel to each of the second prism surfaces of the beam splitter prisms. In this connection, too, it goes without saying even further dichroic layers can also be present in addition to those specifically mentioned.

According to an embodiment of the invention, the first prism surfaces of the beam splitter prisms in the color beam splitter arrangement face in the same direction. Furthermore, according to an embodiment of the invention, the first prism surfaces of the beam splitter prisms are oriented parallel to one another and at a right angle to a common optical axis running through the first and second prism surfaces of the beam splitter prisms. If, as explained below, Bauernfeind prisms are used in each case as the beam splitter prisms, the "first prism surfaces" in this case are the base surfaces, that is to say the largest surfaces, of corresponding Bauernfeind prisms.

An embodiment of the present invention already differs from the prior art, for example DE 24 46 923 A1, in that a use of the prism arrangement in microscopy, rather than in conventional television technology, is proposed here. In microscopy, the requirements made of precision and imaging quality and structural space are significantly higher than in television technology, which was generally of low resolution on the publication date of DE 24 46 923 A1 and of other documents. Therefore, the person skilled in the art would not have deemed older documents from the field of television technology, in particular, to be relevant for use in microscopy.

Furthermore, in principle, television technology requires only that light be split into three color channels (red, green, blue; RGB), in contrast to microscopy, which requires that light be split into more than three color channels with a desired wavelength range in each case. As a logical consequence, DE 24 46 923 A1 and other documents also provide a corresponding configuration, but at any rate not the use of three beam splitter prisms as proposed by an embodiment of the present invention. Proceeding from the prior art from the field of television technology, there was no cause to effect a corresponding extension.

Figure 2:
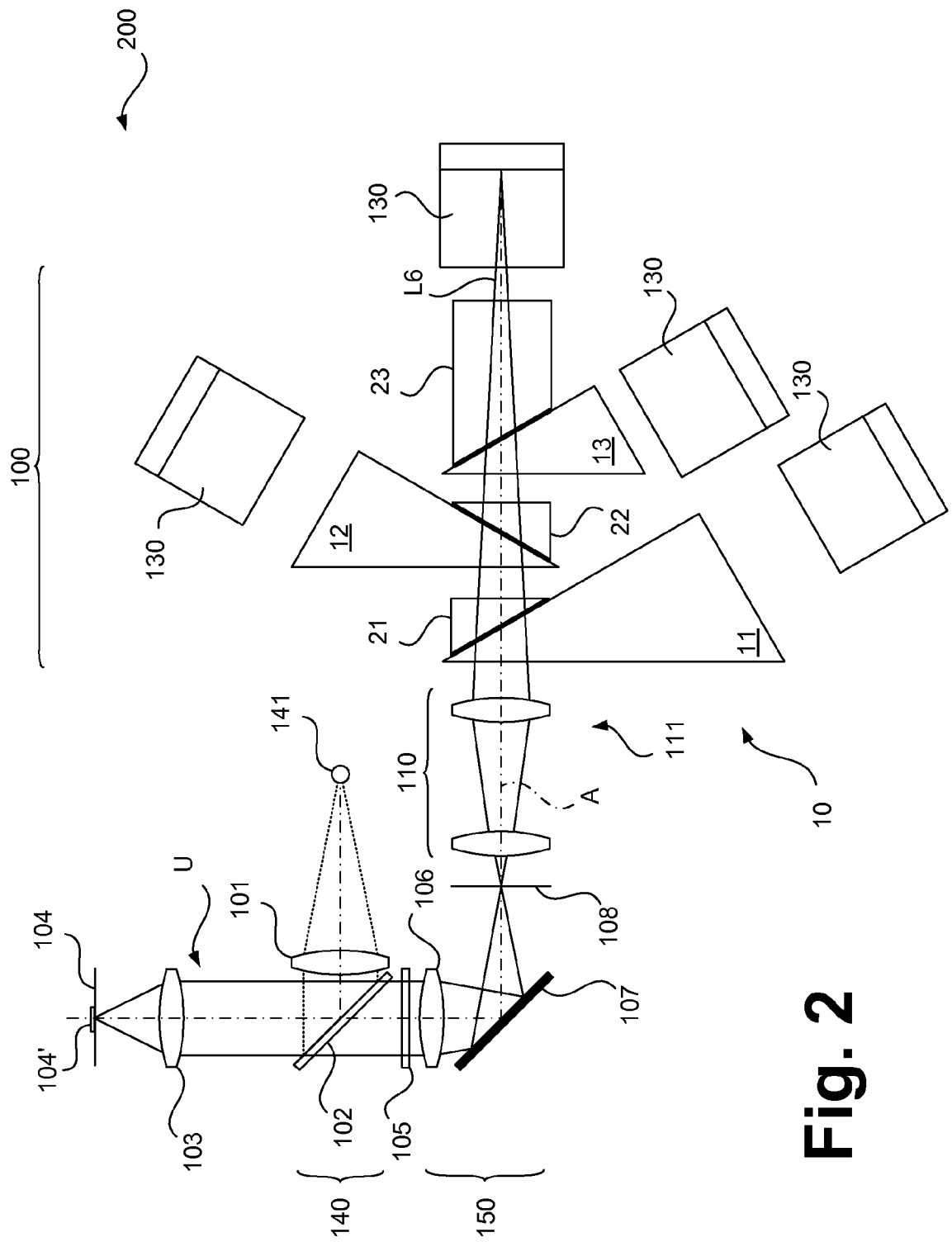
FIG. 2 illustrates a microscope system having a detection unit in accordance with one embodiment of the invention in a greatly simplified schematic partial illustration.

Finally, DE 24 46 923 A1 also does not disclose an arrangement in which first prism surfaces of the beam splitter prisms are oriented parallel to one another and at a right angle to a common optical axis. Rather, here the light entrance surfaces of the prisms 7 and 9 shown in FIG. 2 are inclined in each case relative to the optical axis, which is compensated for by an oppositely directed inclination of the light exit surfaces of the prisms 8 and 10. This gives rise to disadvantages as a result of increased chromatic aberration and scattering losses.

The indication used here that prism surfaces face "in the same direction" should be understood to mean that the sequence from the optically less dense medium to the optically denser medium (in particular air as optically less dense medium to glass or some other material of the beam splitter prisms as optically denser medium) via the first prism surface as interface in a direction along the common optical axis with respect to each of the beam splitter prisms is the same in each case. In principle, the surfaces referred to here as "prism surfaces" are the three or more surfaces of a beam splitter prism that are perpendicular to a common reference plane. Corresponding beam splitter prisms also have further surfaces, for example a Bauernfeind prism has the substantially triangular side surfaces. However, the latter are not perpendicular to the common reference plane mentioned, but rather are in particular parallel thereto. Furthermore, they are not utilized optically and can be given a matt finish, for example, in order to avoid unwanted reflections and hence extraneous light.

Furthermore, an embodiment of the invention provides for the first and second prism surfaces to be oriented in each case at acute first angles to one another, the second and third prism surfaces to be oriented in each case at right or obtuse second angles to one another, and the third and first prism surfaces to be oriented in each case at acute third angles to one another. The angles explained are in each case angles between planes in which the respective prism surfaces lie, and prism interior angles. The prism surfaces mentioned in each case need not directly abut one another, but rather can have, in particular for manufacturing reasons, a chamfer arranged therebetween. However, they lie in corresponding planes in each case.

The indication that the stated angles are present "in each case" here expresses the fact that the angle indications relate to each of the beam splitter prisms separately. In other words, in the case of a first beam splitter prism, the first and second prism surfaces are oriented at an acute first angle to one another, the second and third prism surfaces are oriented at a right or obtuse second angle to one another and the third and first prism surfaces are oriented at an acute third angle to one another. Correspondingly, in the case of a second beam splitter prism, the first and second prism surfaces are oriented at an acute first angle to one another, the second and third prism surfaces are oriented at a right or obtuse second angle to one another and the third and first prism surfaces are oriented at an acute third angle to one another. Furthermore, in the case of a third beam splitter prism, too, the first and second prism surfaces are oriented at an acute first angle to one another, second and third prism surfaces are oriented at a right or obtuse second angle to one another and the third and first prism surfaces are oriented at an acute third angle to one another. However, the first prism surface of the first beam splitter prism for example need not necessarily be oriented at an acute first angle to the second prism surface of the second and/or third beam splitter prism.

Here, as already just mentioned, the first, second and third prism surfaces in each case of a prism are perpendicular to a reference plane. Here the first angles can also have different angle magnitudes, in principle, for different beam splitter prisms. The same correspondingly applies to the second and third angles as well. In other words, the beam splitter prisms can thus have geometries whose differences are not restricted to pure magnification and reduction while maintaining the prism angles, but rather which can additionally also encompass different prism angles.

In embodiments of the present invention, the individual beam splitter prisms can in particular also be rotated about the common optical axis with respect to one another. In this case, the rotation should be understood as rotation about an axis of rotation corresponding to the common optical axis. In this case, the first prism surface of each beam splitter prism can be arranged in a first plane independently of other beam splitter prisms, the second prism surface of each beam splitter prism can be arranged in a second plane independently of the other beam splitter prism(s) and the third prism surface of each beam splitter prism can be arranged in a third plane independently of the other beam splitter prism(s). In the case of each beam splitter prism, the first and second planes then intersect in a first straight line of intersection, the second and third planes intersect in a second straight line of intersection, and the first and third planes intersect in a third straight line of intersection. For simplification and in order to avoid prolix formulations, hereinafter, instead of straight lines of intersection formed by mutually intersecting planes in which prism surfaces of a beam splitter prism lie, mention is made in each case of straight lines of intersection of "the" respective beam splitter prism. In this case, the first, second and third straight lines of intersection of each prism run parallel in space, but the respective straight lines of intersection of different beam splitter prisms can also be skew with respect to one another in space. The specific choice of the arrangements depends, in particular, on the structural stipulations and/or limitations.

In particular, the beam splitter prisms can be arranged in a manner rotated with respect to one another in each case by 180° about the optical axis. In this case, the first straight lines of intersection of two beam splitter prisms, upon projection along the common optical axis onto a projection plane lying parallel to the first prism surfaces, lie parallel to one another, but on different sides of a reference straight line which likewise lies parallel to the first straight lines of intersection in the projection plane and which runs through the point of intersection between the common optical axis and the first plane. The same correspondingly also applies to the second and third straight lines of intersection of these respective beam splitter prisms.

In particular, if a first, a second and a third beam splitter prism are used, the first straight line of intersection of a first of the beam splitter prisms can lie on a first side of the reference straight line, the first straight line of intersection of a second of the beam splitter prisms can lie on a second side of the reference straight line, and the first straight line of intersection of a third of the beam splitter prisms can in turn lie on the first side of the reference straight line. The first straight lines of intersection of the first, second and third beam splitter prisms run parallel to one another in space. The same correspondingly also applies in turn to the second and third straight lines of intersection of these respective beam splitter prisms. In this case, in the context of an embodiment of the present invention, the order of the first, second and third beam splitter prisms is such that the common optical axis runs successively through the first prism surface and the second prism surface of the first beam splitter prism, the first and second prism surfaces of the second beam splitter prism and the first and second prism surfaces of the third beam splitter prism.

In the context of an embodiment of the present invention, generally, regardless of the orientation of the individual beam splitter prisms around the common optical axis, the common optical axis runs through the first and second prism surfaces of the beam splitter prisms, and the dichroic layers having different spectral selectivities are in each case applied to the second prism surfaces or are arranged parallel thereto, in particular at a predetermined distance therefrom. In this case, each of the dichroic layers has in particular a uniform spectral selectivity deviating in each case from the other dichroic coatings. A dichroic layer can be applied to a prism or a prism surface in particular in the form of one or a plurality of metal oxide layers. In this case, the terms "layer" and "coating" are used synonymously here.

Besides a direct coating of prism surfaces, here of the second prism surfaces, it is also possible, in principle, to provide separate, for example plane-parallel, elements having corresponding dichroic layers. Corresponding separate elements can be arranged at a defined distance of, for example, 5 µm or more with respect to a corresponding prism surface. By virtue of such an arrangement in which an air gap is formed between the dichroic layer and the corresponding prism surface and there is thus a great difference in the refractive indices, if appropriate the beam splitting can be implemented in an advantageous way.

By virtue of a corresponding arrangement, light which, in the form of a light beam that is centered relative to the common optical axis, in particular is concentric therewith, is radiated into the color beam splitter arrangement in particular convergently, in the direction of the first prism surface of the first beam splitter prism, can be reflected spectrally selectively at the respective dichroic layers on or at the second prism surfaces of the beam splitter prisms. On account of the arrangement of the first and second prism surfaces at the first angle to one another, correspondingly reflected components, if present, are reflected back onto the first prism surfaces, where they can in particular be subjected to total internal reflection and, in a manner passing through the third prism surfaces, be radiated out of the respective beam splitter prisms.

After optional additional further filtering, for example by means of a bandpass filter, these respective components can then be radiated into a camera or a corresponding detector and in each case be detected there. Correspondingly, spectral components of the light entering the respective prisms which are not reflected at the respective dichroic layers on or at the second prism surfaces pass through them and emerge from the beam splitter prisms. These components can subsequently be detected or pass into a further one of the beam splitter prisms, where they impinge once again on one of the dichroic layers on or at a second prism surface, which has a deviating spectral selectivity, however.

The color beam splitter arrangement provided according to an embodiment of the invention thus comprises, in other words, a plurality (at least three) of beam splitter prisms lying one behind another in the beam path with dichroic layers, which allocate a wavelength range to each partial beam path. For each wavelength range here it is possible to use a detector for detection purposes. The use of an embodiment of the present invention makes it possible for different spectral components of light radiated into the beam splitter arrangement to be detected by correspondingly simple, cost-effective and sensitive monochrome detectors, for example monochrome cameras. A use of multicolor detectors is therefore not necessarily required, but may nevertheless be provided.

Overall, one beam splitter prism fewer than the number of detectors used and thus of the wavelength ranges to be detected is typically required since the light component remaining after the "last" dichroic layer of the beam splitter prisms that have transmitted radiation can advantageously likewise be detected as a corresponding wavelength range.

According to an embodiment of the invention, a number of prismatic compensation elements are furthermore provided in a detection unit. In this case, a "prismatic" compensation element is distinguished by a prism effect. This means that the corresponding compensation elements have entrance and exit surfaces arranged at an angle to one another, in contrast to plane-parallel optical elements. The entrance and exit surfaces are, in particular, the first and second prism surfaces of the compensation elements that are explained below. The entrance and exit surfaces are thus not arranged parallel to one another. Each of the compensation elements comprises one or a plurality of compensation prisms. In other words, in the simplest case, which is also illustrated in the accompanying drawings, a compensation element can be a compensation prism. If a compensation element has a plurality of compensation prisms, the latter have in particular at least partly a surface contact with one another, that is to say are assembled without air gaps and, in particular, are cemented to one another. In the case of cementing, the surface contact is produced by way of the cement layer. In this case, a respective compensation element is assigned to each of the plurality of beam splitter prisms. The compensation elements each have a first and a second prism surface. If a compensation element is constructed from a plurality of compensation prisms, said prism surfaces can in each case also be prism surfaces of different compensation prisms of a compensation element.

The use of the compensation elements can ensure, in particular, as also explained below, that the spectral light components formed in the color beam splitter arrangement traverse in the color beam splitter arrangement and up to their respective detection glass paths that are identical or, as explained below, deviate from one another by not more than a predetermined magnitude. In this case, a "glass path" is the distance traversed by the light in glass, in the present case in particular in one or a plurality of beam splitter prisms and one or a plurality of compensation prisms of one or a plurality of compensation elements. It goes without saying that optionally arbitrary further prisms can also be present besides the compensation prisms of the compensation elements and the beam splitter prisms in a detection unit used in a microscope system according to an embodiment of the invention.

In the context of an embodiment of the present invention, the second prism surface of each of the compensation elements is arranged in a common plane with or parallel to the second prism surface of the respectively assigned beam splitter prism. An arrangement according to an embodiment of the invention furthermore advantageously encompasses the fact that the first prism surface of each compensation element is arranged parallel to the first prism surface of the beam splitter prism respectively assigned thereto. In each case perpendicular emergence of the light from the respective first prism surface of the compensation elements can be brought about in this way. As already mentioned, an arrangement of this type is not provided in the prior art, for example in DE 24 46 923 A1, since there corresponding surfaces are arranged obliquely relative to an optical axis.

In principle, the microscope system in the context of the present invention can be embodied as a wide-field microscope system or as a confocal microscope system and has corresponding beam paths therefor. A particularly advantageous configuration of the present invention relates to a combined wide-field and confocal microscope system in which both beam paths are present.

Wide-field and confocal microscopy differ, as is known, in particular in the proportion of the sample which is in each case illuminated and detected by means of a camera or by means of a detector.

In wide-field microscopy, the sample is illuminated substantially areally. Therefore, a corresponding wide-field microscope system has a light source configured, in association with the illumination optical unit used, for this areal illumination of a sample or of part of an object plane in which the sample is situated. Accordingly, the sample light is also detected areally, typically by means of the two-dimensional cameras mentioned.

By contrast, in confocal microscopy, the sample is scanned in a punctiform or linear fashion using one or a plurality of narrowly delimited, focused light spots or one or a plurality of light lines. Confocal microscopy thus never involves illuminating an area of the sample of a size such as is the case in a wide-field microscope system. Here, the case of punctiform scanning, in particular, is described below.

Punctiform or linear detection corresponding to the illumination is performed in confocal microscopy. For this purpose, in the beam path of the detected light, a pinhole or slit stop is situated in a plane that is conjugate with the object plane, said stop transmitting substantially only the light originating from the object plane and thus from the plane into which the illumination light is focused. Light from planes above and below the image plane is substantially blocked. In this way, only light from a small volume around the respective region on which the illumination light is concentrated passes to the detector, such that optical slice images with high contrast can be generated which contain almost exclusively light from a narrow layer around the respective focal plane.

A wide-field microscope system and a confocal microscope system have an illumination unit, which provides illumination light, and an illumination beam path, which radiates the illumination light into the object plane. Furthermore, a detection beam path is present in each case. The illumination beam path and the detection beam path here can partly correspond to one another, wherein in particular a microscope objective can be part of the illumination beam path and of the detection beam path and can be used both to radiate the illumination light into the object plane and to collect the light emitted from the object plane and make it accessible to detection. In other words, the illumination beam path and the detection beam path can partly coincide in corresponding microscope systems.

In wide-field microscopy provision is made, as mentioned, for areally illuminating the sample in the object plane, such that the illumination unit together with the illumination beam path is configured to illuminate a predefined sample region. It goes without saying that the illuminated sample region can be delimited by the use of stops and the like. In particular, the illumination unit together with the illumination beam path can be configured for providing Kohler illumination of the sample. In this case, the illumination beam path images an image of the illumination unit by means of a first lens and a second lens or by means of a first lens system and a second lens system into an aperture stop plane and into a plane in which the back objective pupil of the microscope objective is situated. The illumination light therefore radiates through the object plane preferably in the form of a substantially parallel beam of light. The plane of the illumination unit, the aperture stop plane and the plane in which the back objective pupil of the microscope objective is situated are therefore a first set of conjugate planes. Furthermore, a second set of conjugate planes is found in the illumination beam path. This involves the object plane and the luminous field stop plane. The luminous field stop plane is thus imaged into the object plane.

By contrast, confocal microscopy makes use of a point light source, which can be embodied in principle as a single or multiple point light source, that is to say that a single light spot or a plurality of light spots can be generated, which can then be focused into the object plane by the illumination optical unit. By way of example, a laser beam can be used as a single point light source, said laser beam being focused onto the stop opening of a (single) pinhole stop. Particularly intensive illumination can be effected in this way. A multiple point light source can be realized in particular by means of a rotatable multiple pinhole stop in the form of a Nipkow disk, as explained for example in Toomre, D. and Pawley, J. B., Disk-Scanning Confocal Microscopy, chapter 10 in Pawley, J. B. (ed.), Handbook of Biological Confocal Microscopy 3rd edition, Springer-Verlag 2006. A multiplicity of stop openings arranged in the form of a plurality of spiral arms are provided in such a rotatable multiple pinhole stop. Light, for example from a white light source or a laser, can then be focused onto the multiple pinhole stop or the stop openings thereof from the side facing away from the object plane by means of a likewise rotating microlens disk, for example. The advantage of a corresponding configuration is the fast, multi-line scanning of the sample.

In both cases, i.e. when using a single or a rotatable multiple pinhole stop, the illumination beam path is configured in such a way that the light from the object plane also passes through a single or multiple pinhole stop, respectively. This can be the same pinhole stop that is also used for illumination, particularly in the case of a rotatable multiple pinhole stop. For details, reference should be made to the technical literature cited. However, a separate pinhole stop can also be involved, particularly if a single point light source or a corresponding single pinhole stop is used.

With the use of a rotating multiple pinhole stop having stop openings arranged in the form of spiral arms, the sample can already be scanned just by means of the rotation; separate deflection systems (scanners) are not required. By contrast, single point light sources require corresponding deflection systems or scanning devices as known from the prior art. By way of example, in this connection reference is made to Stelzer, E. H. K., The Intermediate Optical System of Laser-Scanning Confocal Microscopes, chapter 9 in Pawley, J. B. (ed.), Handbook of Biological Confocal Microscopy, 3rd edition, Springer-Verlag 2006.

Corresponding scanning devices are arranged in particular in the telecentric plane or a plane that is conjugate therewith, since the angle of a light ray in this plane defines the lateral position of the focal point thereof in the object plane. In particular, a pivotable mirror can be used here, the pivot of which lies in the center of the telecentric plane. In order to enable a deflection in the x-direction and y-direction (that is to say two directions in the object plane perpendicular to one another), a single mirror can be used, which is tiltable about a first axis in a mount, wherein the mount itself is again tiltable about a second axis perpendicular to the first axis. Arrangements having two mirrors tiltable about different axes in each case are also known, which are then arranged respectively above and below the telecentric plane or plane that is conjugate therewith.

In the microscope system according to an embodiment of the invention, an objective and a tube optical unit arranged on the image side of the objective are provided, wherein advantageously an infinity beam path is formed between the objective and the tube optical unit and the tube optical unit focuses light from the infinity beam path into an image plane, which is arranged on the image side of the tube optical unit and is conjugate with respect to an object plane. A tube optical unit can be embodied in particular as a tube lens or as a set of corresponding lenses. Microscopes having infinity beam paths have the particular advantage that a corresponding infinity beam path can be lengthened (in moderation) and introduction of further optical elements is thus possible in a simple manner. This applies for example to parts of a wide-field illumination system explained below.

In this case, the microscope system according to an embodiment of the invention advantageously has a corresponding wide-field illumination system and a wide-field detection system, wherein the wide-field illumination system and the wide-field detection system are provided for areal illumination and detection of a region of the object plane. It goes without saying that an illumination system and a detection system can generally also have common elements. In this regard, as mentioned, for example, for the reasons explained above, the microscope objective is part of an illumination system and part of a detection system. In other words, a beam path of an illumination system and a beam path of a detection system can also run congruently with respect to one another in specific sections.

The wide-field illumination system advantageously comprises a splitter mirror arranged in the infinity beam path, said splitter mirror coupling light from a light source, which is likewise part of the wide-field illumination system and can be embodied as a cold light or LED light source, for example, into the infinity beam path between the objective and the tube optical unit or into a further infinity beam path, which can be embodied in particular on the image side of the tube optical unit. In this case, the wide-field illumination system advantageously has an illumination optical unit that provides the light from the light source in a suitable manner, for example in the form of a convergent, divergent or collimated light beam.

As mentioned, a microscope system in accordance with one particularly advantageous configuration of the present invention is embodied as a combined wide-field and confocal microscope system. It therefore advantageously has, besides a wide-field illumination system and a wide-field detection system, a confocal illumination system and a confocal detection system for the punctiform scanning of a region of the object plane. In this case, the wide-field illumination system and the wide-field detection system are in particular at least partly separated from the confocal illumination system and a confocal detection system. In particular, the wide-field detection system and the confocal detection system are assigned in each case one of the detection units used, as will also be explained further below. The confocal illumination system and the confocal detection system can be embodied, in principle, as explained above with reference to the prior art.

In particular, in a microscope system according to an embodiment of the invention, the confocal illumination system has a point light source in a plane that is conjugate with respect to the object plane and the image plane, and the confocal detection system has in particular a pinhole stop in the plane that is conjugate with respect to the object plane and the image plane or a further plane that is conjugate with respect to the object plane and the image plane.

A "point light source" is understood here to mean any light source that enables point illumination of a sample. In particular, a point light source can be an end of an optical fiber used to feed light to the confocal illumination system. It can also be, in particular, a stop opening of a pinhole stop situated in the focal plane of an optical unit that focuses illumination light. By virtue of the fact that the point light source is situated in a plane that is conjugate with respect to the object plane and the image plane, focused illumination of a point in the sample is effected in the microscope system according to an embodiment of the invention. By virtue of the arrangement of the pinhole stop in the plane that is conjugate with respect to the object plane and the image plane or in a further conjugate plane in the confocal detection system, it is possible to achieve the abovementioned advantage that substantially only light from the focal plane reaches the detectors.

Insofar as "punctiform" illumination or scanning is mentioned here in each case, it is understood that a corresponding "point" is not taken to mean a point with zero extent in the mathematical sense, but rather a point according to a diffraction-optical point spread function. Its extent is substantially given by the wavelength of the light used and the numerical aperture of the focusing optical unit.

In the microscope system according to an embodiment of the invention, the confocal illumination system can have in particular a scanning device for deflecting illumination light, which scanning device can be embodied in the manner explained and be arranged in particular in a telecentric plane or plane that is conjugate therewith.

Preferably, a microscope system according to an embodiment of the invention comprises the plurality of detection units comprising the first detection unit and the at least one second detection unit, of which a first detection unit is assigned to the wide-field detection system and the at least one second detection unit is assigned to the confocal detection system. In this case, the detection units can be equipped in particular with different detectors, namely the first detection unit in particular with area detectors or cameras and the at least one second detection unit with point detectors.

Advantageously, a switchover between wide-field and confocal operation is possible in a microscope system according to an embodiment of the invention. For this purpose, in particular, a switchover mirror arrangeable in two positions can be provided on the image side of the tube optical unit, wherein light is radiated into the wide-field detection system (and in particular not into the confocal detection system) in a first position of the switchover mirror and light is radiated into the confocal detection system (and in particular not into the wide-field detection system) in a second position of the switchover mirror. The mirror brings about here in one of the positions, in particular, a deflection of the beam path into the respective detection system impinged on by light.

In accordance with one particularly preferred embodiment of the present invention, the second prism surface of one or a plurality of the compensation elements is cemented in each case onto at least one part of the second prism surface of the respectively assigned beam splitter prism. A parallel arrangement of the corresponding prism surfaces or an arrangement in one plane can be achieved in this way, without further securing and alignment means. In this case, the dichroic layer situated in each case on or at the second prism surface of the corresponding beam splitter prism can at least partly be introduced into such a cement layer or be covered by said cement layer. In this way, the respective dichroic layer can correspondingly be protected or it is possible to ensure that interface effects to which the light passing through the dichroic layer is exposed, for example, can be alleviated or eliminated.

In principle, however, the arrangement can also be such that an air gap is provided between the second prism surface of one or a plurality of the compensation elements and the second prism surface of the respectively assigned beam splitter prism, as a result of which the beam splitting performance, as mentioned, may possibly be positively influenced. However, this arrangement possibly brings about an increased assembly and alignment outlay.

In any case, the dichroic layer of each of the beam splitter prisms is situated at least partly between the second prism surface of said beam splitter prism and the second prism surface of the assigned compensation element. In this case, in the linguistic usage used here, an arrangement of a beam splitter layer "between" prism surfaces is present both when a corresponding dichroic layer is applied to one of the prism surfaces and when a further element of a type explained above with a dichroic layer is introduced between the respective prism surfaces, irrespective of whether or not an air gap is present.

In a corresponding color beam splitter arrangement, advantageously the first angles have identical angle magnitudes, the second angles have identical angle magnitudes and the third angles have identical angle magnitudes. In this configuration, the beam splitter prisms are therefore embodied identically with regard to their angles. Given correspondingly identical angles, however, they can have different sizes, that is to say different volumes. This can be provided in order to ensure, in combination with further measures such as additional prisms, that the light components respectively formed by the dichroic splittings traverse glass paths that are identical or coordinated with one another, as will also be explained below.

Here, the first angles can be in particular in each case 30°, the second angles can be in particular in each case 90° and the third angles can be in particular in each case 60°. As an alternative thereto, the first angles can also be in each case 22.5°, the second angles can be in each case 112.5° and the third angles can be in each case 45°. In particular, as mentioned, the beam splitter prisms in the context of the present invention can be embodied in each case as Bauernfeind prisms.

In the case of a detection unit of a microscope system according to an embodiment of the invention, the plurality of beam splitter prisms of the color beam splitter arrangement comprise in particular a first, a second and a third beam splitter prism, wherein the common optical axis enters the beam splitter arrangement perpendicular to the first prism surface of the first beam splitter prism and emerges from the beam splitter arrangement perpendicular to the first prism surface of the compensation element assigned to the third beam splitter prism.

One particularly advantageous configuration arises with the use of a color beam splitter arrangement in which only the first, the second and the third beam splitter prism are provided, wherein the common optical axis runs successively through the first and second prism surfaces of the first beam splitter prism, through the first and second prism surfaces of the second beam splitter prism and through the first and second prism surfaces of the third beam splitter prism. In this way, the optical axis also passes successively through the respectively associated compensation elements or their prism surfaces. In this way, splitting of light into a total of four wavelength ranges can be achieved, which is able to be realized by means of a minimal number of optical elements and in the case of which the glass paths and the number of interfaces are minimized in comparison with the conventional color beam splitter arrangements explained in the introduction. The individual beam splitter prisms can be arranged in a manner offset or rotated with respect to one another in the manner explained above in particular in an arrangement of this type.

Light which, in an arrangement of this type, is radiated in the form of a light beam along the common optical axis via the first prism surface into the first beam splitter prism and thus the color beam splitter arrangement overall experiences in this case the following influencing by the color beam splitter arrangement or the beam splitter prisms thereof:

A first wavelength range or spectral component of the light radiated into the first beam splitter prism, for which wavelength range or spectral component the dichroic layer or coating applied to the second prism surface of the first beam splitter prism is selective or has a reflective effect, is reflected at the second prism surface of the first beam splitter prism, or at the dichroic layer applied thereto, back to the first prism surface of the first beam splitter prism, is reflected again at said first prism surface and, passing through the third prism surface of the first beam splitter prism, is radiated out of the latter. A second wavelength range or spectral component of the light radiated into the first beam splitter prism, for which wavelength range or spectral component the dichroic layer or coating applied to the second prism surface of the first beam splitter prism is non-selective or transparent, penetrates through said layer or coating and, after it has subsequently radiated through the second and first prism surfaces of the assigned compensation element, is radiated into the second beam splitter prism via the first prism surface of the second beam splitter prism.

An in turn first wavelength range or spectral component of the light radiated into the second beam splitter prism in this way, for which wavelength range or spectral component the dichroic layer or coating applied to the second prism surface of the second beam splitter prism is selective or has a reflective effect, is reflected at the second prism surface of the second beam splitter prism, or at the dichroic layer applied thereto, back to the first prism surface of the second beam splitter prism, is reflected again at said first prism surface and, passing through the third prism surface of the second beam splitter prism, is radiated out of the latter. A second wavelength range or spectral component of the light radiated into the second beam splitter prism, for which wavelength range or spectral component the dichroic layer or coating applied to the second prism surface of the second beam splitter prism is non-selective or transparent, passes through said layer or coating and, after it has subsequently radiated through the second and first prism surfaces of the assigned compensation element, is radiated into the third beam splitter prism via the first prism surface of the third beam splitter prism.

An in turn first wavelength range or spectral component of the light radiated into the third beam splitter prism in this way, for which wavelength range or spectral component the dichroic layer or coating applied to the second prism surface of the third beam splitter prism is selective or has a reflective effect, is reflected at the second prism surface of the third beam splitter prism, or at the dichroic layer applied thereto, back to the first prism surface of the third beam splitter prism, is reflected again at said first prism surface and, passing through the third prism surface of the third beam splitter prism, is radiated out of the latter. A second wavelength range or spectral component of the light radiated into the third beam splitter prism, for which wavelength range or spectral component the dichroic layer or coating applied to the second prism surface of the third beam splitter prism is non-selective or transparent, passes through said layer or coating and, after it has subsequently radiated through the second and first prism surfaces of the assigned compensation element, is radiated out, but then passes to detection.

The first component of the light radiated into the first beam splitter prism, which first component is radiated out of the latter via the third prism surface, is advantageously fed to a first camera or a first detector or, in particular via a corresponding interface, is radiated out of the detection unit. It can also be filtered beforehand in a suitable manner, for example by means of a bandpass filter. The first component of the light radiated into the second beam splitter prism, which first component is radiated out of the latter via the third prism surface, is advantageously fed to a second camera or a second detector or, in particular via a corresponding interface, is radiated out of the detection unit. This component, too, can be filtered beforehand in a suitable manner, for example by means of a bandpass filter. The first component of the light radiated into the third beam splitter prism, which first component is radiated out of the latter via the third prism surface, is advantageously fed to a third camera or a third detector or, in particular via a corresponding interface, is radiated out of the detection unit. This component, too, can be filtered beforehand in a suitable manner, for example by means of a bandpass filter. The second component of the light radiated into the third beam splitter prism, said second component being radiated out of the latter via the second prism surface and then radiating through the second and first prism surfaces of the associated compensation element, is advantageously fed to a fourth camera or a fourth detector or, in particular via a corresponding interface, is radiated out of the detection unit. This component, too, can be filtered beforehand in a suitable manner, for example by means of a bandpass filter.

The data detected by means of the first, second, third and fourth detector, if present, for example by means of the images recorded by means of corresponding cameras, in particular monochromatic images, can be processed by means of a suitable imaging device, in particular by means of digital means, as will also be explained in even greater detail with reference to the method according to embodiments of the invention and its configurations. In particular, corresponding images can be brought to registration, wherein in particular imaging-inherent markings, i.e. markings originating from the observed structures, or artificial markings can be used. If an evaluation is carried out by means of point detectors in a confocal detection system, correspondingly detected data can be combined with the known control data of a scanning device to form an image.

Irrespective of the specific number of beam splitter prisms and compensation elements, the color beam splitter arrangement of a detection unit that is usable according to an embodiment of the invention advantageously splits multichromatic light radiated into the color beam splitter arrangement along the common optical axis through the first prism surface of the first beam splitter prism into a plurality of spectral components, each of which can be detected.

Advantageously, in this case, one of the plurality of spectral components is radiated out of the beam splitter arrangement via the first prism surface of the compensation element assigned to the third beam splitter prism. The other spectral components, if present, are radiated out of the beam splitter arrangement in each case via the first, second and third beam splitter prisms. A maximum utilization of a detection unit arises in an embodiment in which the number of spectral components is greater than the number of beam splitter prisms by one, wherein one of the spectral components is radiated out of the beam splitter arrangement via the first prism surface of the compensation element assigned to a last beam splitter prism, and respectively one of the other spectral components is radiated out of the beam splitter arrangement via the third prism surface of respectively one of the plurality of beam splitter prisms. In this way, it is possible to achieve maximum splitting into spectral components with a minimum number of component parts.

In a detection unit that is usable according to an embodiment of the invention, the first prism surface of the compensation element assigned to the last beam splitter prism and/or at least one of the third prism surfaces of the plurality of beam splitter prisms can be assigned in each case an interface or an output for fitting a detector and/or a corresponding detector itself. In this configuration, in particular freely selectable detectors can be fitted modularly to the interfaces or a portion of the interfaces. In particular, in this case the interfaces can be provided as mechanical standard interfaces, for example in the form of so-called C-mounts, bayonet adapters and the like, which enable the detectors or cameras to be changed without tools, in particular. Corresponding mechanical interfaces can in particular also be embodied in an adjustable fashion in order to set for example an image position along or perpendicular to the optical axis.

In accordance with a further configuration, a detection unit that is usable according to an embodiment of the invention can also already comprise a plurality of detectors, wherein each of the plurality of detectors has a detection plane. The number of detectors is arbitrary, in principle. In one particularly preferred embodiment of the present invention, however, the number of detectors is greater than the number of beam splitter prisms by a maximum of one. In this configuration, the maximum beam splitting mentioned can be achieved by means of a minimum number of optical component parts. In this case, respectively one of the spectral components formed in the color beam splitter arrangement is fed respectively to a detector and detected in the latter. In this case, the detection plane of one of the detectors is arranged in a common plane with or parallel to the second prism surface of the compensation element assigned to the last beam splitter prism, and the other detectors are arranged in such a way that their respective detection planes lie in a common plane with or parallel to the third prism surface of a respective one of the beam splitter prisms.

The color beam splitter arrangement for use in an embodiment of the present invention, as mentioned repeatedly, is configured in such a way that the beam splitter prisms are respectively assigned corresponding compensation elements having a first and a second prism surface. What can be brought about by means of a corresponding arrangement is, in particular, that the optical paths or glass paths between an input side of the color beam splitter arrangement, for example a corresponding adapter to a microscope, and the corresponding cameras or detectors in all partial beam paths formed by the spectrally selective output couplings of wavelength components explained are identical or optimized or coordinated with one another in such a way that residues of longitudinal chromatic aberrations, for example of a camera adapter or of some other optical arrangement, in particular between the color beam splitter arrangement and a microscope, are compensated for.

In accordance with one particularly preferred embodiment of the present invention, it is thus provided that the compensation elements are embodied in such a way that in each case optical paths of the spectral components of the multichromatic light, in particular starting from the first prism surface of the first beam splitter prism as far as the respective detection surfaces of the detectors, in the color beam splitter arrangement traverse glass paths whose lengths differ by not more than a predetermined magnitude. The predetermined magnitude |d| by which the respective glass paths are permitted maximally to differ or advantageously should maximally differ can be determined here in particular in accordance with $$|d| \leq \frac{n_1 n_2}{n_1 - n_2} \frac{\lambda}{NA^2}$$

wherein $n_1$ indicates a refractive index of the material respectively used for the components of the beam splitter arrangement at the lower wavelength limit of the light considered, $n_2$ indicates the corresponding refractive index at the upper wavelength limit, 2 indicates an average wavelength used, and NA indicates the numerical aperture of the imaging on the detector or on a corresponding detector plane. If light in a wavelength range of 400 to 500 nm is considered, for example, $n_1$ denotes the refractive index at 400 and $n_2$ the refractive index at 500 nm. The average wavelength used can be 465 nm, in particular. The numerical aperture NA is the sine of half the aperture angle of the beam of rays impinging on the detector or the detection plane.

What can be achieved by the use of a corresponding maximum permissible difference magnitude |d| is that the longitudinal chromatic aberration of the imaging is smaller than the depth of field and is therefore not manifested in a negative way.

In particular, in the context of an embodiment of the present invention, instead of the magnitude d, it is possible to choose a magnitude corresponding to at most 25%, 50% or 75% of the magnitude |d| determined in accordance with the equation above. In this way, in the context of an embodiment of the present invention, further influences on the longitudinal chromatic aberration can be taken into account in addition to the possibly different glass paths.

Particularly advantageously, in each case the compensation elements or their compensation prisms are formed from the same material as, or a material having an optical density the same as or comparable to, the respective beam splitter prisms to which they are assigned. All prisms, i.e. all beam splitter prisms and all compensation elements or compensation prisms, can also be formed from the same material or a material having the same or a comparable optical density.

In a detection unit of the microscope system provided according to an embodiment of the invention, a light beam that emerges via the second prism surface of one of the beam splitter prisms and enters the compensation element assigned thereto via the second prism surface of the compensation element passes in the corresponding beam splitter prism and its assigned compensation element in particular without a parallel offset and in the same direction. Correspondingly, a light beam that emerges from the compensation prism via the first prism surface of one of the compensation elements that is assigned to a beam splitter prism, and is radiated into a downstream beam splitter prism, passes in the downstream beam splitter prism without a parallel offset and in the same direction as previously in the corresponding compensation element. What is brought about by the use of the compensation elements is, in particular, that the entrance and exit surfaces at the transition from and to the optically less dense medium are perpendicular to the optical axis.

Particularly advantageously, as already explained in the introduction, the color beam splitter arrangement is part of a multi-camera module. For this purpose, the detection unit advantageously has a housing having an input configured for coupling to a suitable photo-output or detection output of a microscope. In this case, a corresponding "input" is configured to radiate light from the microscope, in particular light composed of a plurality of spectral wavelength components, into the color beam splitter arrangement. Said light can be, for example, light which is radiated out of the microscope via a multi-band fluorescence splitter cube. A corresponding input can be embodied in particular as an optical-mechanical interface, the connection plane of which is likewise perpendicular to the common optical axis, mentioned repeatedly, which passes through the first and second prism surfaces of the beam splitter prisms. A corresponding input is configured in particular for direct or indirect coupling to a corresponding photo-output of a microscope, wherein here a "direct" coupling is understood to mean a coupling without interposed further mechanical and/or optical elements and an "indirect" coupling is understood to mean a coupling by means of a mechanical and/or optical adapter with arbitrary further elements as explained in the introduction.

In the linguistic usage used here, a "photo-output" is an optical-mechanical interface of a microscope via which observation light, that is to say light emitted or reflected back from a sample observed, can be radiated out of the microscope. This can involve the observation light in its entirety, but a corresponding photo-output can also receive only part of the observation light, for example if light components are coupled out of the observation beam path of the microscope into said photo-output via a beam splitter, which is not spectrally selective in this case. The same correspondingly applies to a "detection output", in particular in the case of a confocal microscope system.

A photo-output can be embodied as an infinity interface, that is to say that the observation light or a corresponding image of the sample can be imaged into infinity. A photo-output can also be configured for example for providing observation light in collimated form, that is to say with traditional finite optics.

The photo-output, the detection unit and/or an interposed adapter can also have a focusing optical unit configured in such a way that the observation light is focused onto a detector area of the cameras or detectors respectively used. Advantageously, irrespective of the specific embodiment, in all cases the observation light in the detection unit is radiated into the respective beam splitter prisms in the form of a convergent beam of rays, wherein a focal plane lies in each case in the plane of the cameras or detectors used. Here, the measures explained above ensure that the respective partial beam paths generated by the dichroic splittings have lengths that are identical or, for example for compensating for longitudinal chromatic aberrations, are coordinated with one another, in particular glass paths that are identical or coordinated with one another.

A method for microscopic imaging using a microscope system having a first detection unit explained above in a multiplicity of different configurations or a plurality of such detection units comprising a first detection unit and at least one second detection unit is likewise the subject matter of an embodiment of the present invention. In this case, by means of the microscope, light having a plurality of wavelength components is radiated into the detection unit or at least one of the detection units with the respective beam splitter arrangement and is decomposed into different spectral components. The different spectral components are detected in each case by detectors. With regard to the respective features and advantages, which also affect the method according to an embodiment of the invention in a corresponding way, reference should expressly be made to the above explanations regarding the color beam splitter arrangement.

In particular, in this case, a microscope system can be used which has a wide-field illumination system and a wide-field detection system for areal illumination and detection of a region of the object plane and also a confocal illumination system and a confocal detection system for punctiform scanning of a region of the object plane, wherein the method comprises a wide-field operating mode and a confocal operating mode, between the switchover is effected in accordance with a user stipulation. Here, the switchover mirror explained above can be used, for example, such that only one of the systems in each case receives light.

In the method according to an embodiment of the invention, the different spectral components detected by the detectors are processed at least partly by means of a computing unit, wherein processing comprises in particular an evaluation of the individual spectral components which are detected in the form of digital image data, in particular. Different spectral components can also be at least partly fused with one another, for example combined to form overall image data, wherein an evaluation also or only of the overall image data can be carried out. A corresponding evaluation can be effected in particular as data evaluation, in particular as image evaluation, and can comprise an assessment of an image brightness or intensity, of a contrast and/or, particularly if multicolor detectors are used, of different color components. Processing can for example also comprise other method steps known from the field of image processing, such as a white or color balance, a zero value subtraction, a digital filtering, a normalization, a contrast compensation, a contrast increase, a sharpening or a segmentation.

On the basis of a corresponding data evaluation, in particular detection and illumination parameters of the microscope and/or detection parameters of at least one of the detectors can be set in order in this way to obtain further sample information in a targeted manner.

In particular, an intensity, a wavelength and/or a polarization of light of at least one light source in an illumination unit of the microscope can be set as illumination parameters. In this way, too, a spectral segregation, as will be explained below, can be facilitated for example by a selective excitation of only one fluorophore. Furthermore, by way of example, a suitable setting of the light intensity of a wavelength makes it possible to prevent an image from being swamped by the fluorescence response of the correspondingly excited fluorophore.

Detection parameters can comprise for example different electronic gains of the detector(s) used. Besides a variation of the excitation by means of the incident light or a shift of the excitation wavelength, an adaptation of the detection channel by means of a setting of the electronic gain can also facilitate a spectral segregation. An exposure time can also be set accordingly.

In particular, as already discussed, the processing of the different spectral components can comprise registration and superimposition of at least one portion of the different spectral components. In this case, as already discussed, in particular imaging-inherent markings, i.e. markings originating from the structures observed, or artificial markings can be used. The registration can be performed particularly reliably in this way.

In accordance with one particularly advantageous embodiment of the present invention, provision can also be made for providing position deviation data for at least one portion of the different spectral components and for using them for the registration. By way of example, a detection unit used in the context of an embodiment of the present invention can be calibrated after manufacture or after adjustment, wherein a deviation of an image position vis-à-vis a standard position or desired position or an average image position of all the spectral channels can be detected for each spectral channel. Such a detection is possible in particular using imaging-inherent structures as just explained, which can be detected in particular using calibration or standard pieces.

In the context of the present invention, corresponding deviations can be kept available in particular in the form of calibration data and be used during a later examination and processing. The calibration data can also be stored for example in one or more, in particular nonvolatile, data memories assigned the detection unit or specific detectors, for example in a common housing.

In accordance with one particularly advantageous embodiment of the present invention, the processing of the different spectral components can comprise a spectral segregation, in particular after the spectral components have been detected in the form of individual image data, brought to registration and combined to form overall image data. In the context of an embodiment of the present invention, the spectral segregation can in particular be provided by means of the measures explained above for attenuating or amplifying a detection channel.

The spectral segregation can comprise a linear spectral segregation, in particular. This applies particularly if a corresponding sample is marked with one or more fluorescent dyes. A spectral segregation can be performed using reference spectra, for example, on the basis of which the contribution of the respective fluorophores can be determined or estimated. The spectral segregation, which is known in principle from the prior art, makes it possible, in particular, to perform an exact separation of a series of different fluorescent dyes having very similar emission spectra. For further details, reference should be made to relevant technical literature.

A spectral segregation can be facilitated by virtue of the fact that the contribution of one or more fluorophores to an overall spectrum can be increased or reduced by the control of the illumination unit or optionally of different detectors, as explained above. In this way, it is possible, for example, to obtain reference spectra that result from an excitation of light with a specifically selected property and to compare them with an overall spectrum. In other words, the contributions of other fluorophores to a spectrum can be influenced in a targeted manner in order to be able better to assess the contribution of a fluorophore to be examined.

If a spectral segregation is performed, the evaluation of the individual image data advantageously comprises a phasor analysis, and the control is effected on the basis of the phasor analysis. The microscope system proposed according to an embodiment of the invention proves to be particularly advantageous in particular in connection with such a phasor analysis because the signal/noise ratio here can be crucial for the separation or spectral segregation. Therefore, it is particularly advantageous here if there is the possibility of increasing individual colors or spectral channels with regard to their intensity or adapting them with regard to the noise present. This is possible in the context of an embodiment of the present invention.

In a phasor analysis, the components of the individual pixels are represented as points in a phasor plot. Individual spectral components represent point clouds in such an evaluation. The diameter of said point clouds depends on the noise and in this case is ideally minimized to an extent such that a sufficiently accurate identification of the contributions to the color value of a pixel by the individual dyes is possible. The use of the detection unit provided according to an embodiment of the invention offers a user a possibility for deciding between the precision of the spectral segregation and the burdening of the sample by more intense illumination.

In one particularly preferred embodiment of the method proposed according to the invention, the different spectral components are detected in the form of pixel data and/or the processing comprises generating pixel data. In such a case, a content of one or a plurality of pixels in the pixel data, the spectrum of which is brought about only by the contribution of exactly one fluorophore, can be determined in the pixel data. This content or these contents can then be used as a reference value for the spectral segregation. One or a plurality of such reference values can thus be, in particular, contents of one or a plurality of pixels, the spectrum of which is brought about only by the contribution of one fluorophore.

Further aspects and advantages of embodiments of the present invention and further configurations which can be provided and be advantageous in combination with all of the embodiments explained above are explained in summary again below.

The cameras or detectors which can be used in a detection unit in the context of an embodiment of the present invention or can be coupled to a corresponding color beam splitter arrangement or be installed therein advantageously have the same pixel size and pixel arrangement, such that a superimposition of the images of all cameras is possible electronically without possibly error-susceptible scaling. This relates only to area detectors, of course. In particular, a fixedly predefined, non-changeable spectral splitting between the cameras or corresponding detectors can be achieved by means of the color beam splitter arrangement proposed according to an embodiment of the invention. High reproducibility and simplicity in the operational control are possible in this way. On account of the respectively identical and even number of reflections, positionally identical images can be obtained on all the cameras or detectors.

The use of Bauernfeind prisms is particularly advantageous since, in the case of a small angle of incidence, in particular 30°, the optical properties of the dichroic layer on the second prism surface are better than, in particular, in the case of the devices known from the prior art. The double reflection at the beam splitter prisms ensures that the images are oriented identically on all the cameras or detectors and it is therefore not necessary to take account of the capability of the cameras or detectors for image mirroring in terms of hardware. Since the second reflection is advantageously a total internal reflection on account of a correspondingly small angle of incidence of the light on the first prism surface, this reflection has no adverse effects on the transmission or imaging properties.

In the context of an embodiment of the present invention, the glass paths in the prisms, that is to say the beam splitter prisms and the compensation elements advantageously provided, are chosen with two objectives, in principle. Since all the glass paths can be of equal length or coordinated with one another by means of the compensation elements, the optical system of the camera adapter optionally provided or the parameters of the light beam radiated into the color beam splitter arrangement need only be optimized with respect to this glass path and the imaging quality at all the cameras or detectors is dependent only on the quality of the camera adapter. In the context of an embodiment of the present invention, the length of the glass paths to the various cameras or detectors or an adaptation of corresponding glass paths by means of the size and, if appropriate, geometry of the beam splitter prisms and also the size and, if appropriate, geometry of the compensation elements assigned thereto can be used, in particular, to compensate for small residues of the longitudinal chromatic aberration in the various channels.

In the context of an embodiment of the present invention, it is possible to use cameras or detectors which have sensitivities optimized for their respective spectral range. The sensitivity of the detection overall is improved in this way. The images of the cameras or detectors can be superimposed with pixel accuracy, in particular, by means of a computing unit, in particular a field programmable gate array (FPGA), a central processing unit (CPU) or a graphics processing unit (GPU). In this case, for example, a mechanical inaccuracy in the lateral image position or the set-up of the cameras can be compensated for. A data carrier having specific calibration information of the respective system that can be used to compensate digitally for mechanical inaccuracies or residual optical aberrations (distortion, transverse chromatic aberration, etc.), for example, can be integrated for example in a nonvolatile electronic memory component (EEPROM) in a corresponding camera module or the color beam splitter arrangement.

The assignment of the emission light emitted by a dye on the basis of the images of the cameras or detectors can be effected in particular by means of the known so-called spectral unmixing. In this case, the sum of the spectral information for the individual fluorophores is separated into separate images. For the spectral unmixing, it is possible to use algorithms that compare the spectral content of each pixel of a pixel stack, such as is obtained as a result of the superimposition, with possible summation combinations of the known spectra of the fluorophore molecules of a sample.

The parameters of the spectral unmixing as explained can be chosen depending on the image position or the image-side aperture in order to be able to compensate for small differences in the spectral properties of the partial beam paths (e.g. caused by varying angles of incidence on the dichroic layers). In this case, it is possible, in particular, to transmit only the brightness values of individual dyes instead of the raw data of the individual detectors.

The aim of the spectral detection is splitting in a sufficient number of channels in order to be able to separate even dyes whose spectra differ from one another only to a small extent. Nevertheless, care must be taken to ensure that the number of color channels chosen is not too high, since otherwise the signal in the channels turns out to be weak and the signal-to-noise ratio turns out to be too high. In the context of an embodiment of the present invention, particularly advantageous splitting can be achieved by the choice of three beam splitter prisms, for example. In the context of an embodiment of the present invention, however, the use of two or more than three beam splitter prisms is also possible, in principle.

Embodiments of the invention are explained in greater detail below with reference to the accompanying drawings, wherein the drawings illustrate preferred embodiments of the present invention and further aspects in greater detail.

FIG. 1 illustrates a detection unit for a microscope system in accordance with one particularly preferred embodiment of the present invention in the form of a greatly simplified schematic partial illustration. In this case, the detection unit is designated in its entirety by 10, and a color beam splitter arrangement provided as part of the detection unit 10 is denoted in combination by 100. A camera adapter that can be part of the detection unit 10 or provided separately therefrom bears the reference sign 110 overall.

As explained repeatedly above, a corresponding detection unit 10, with or without a corresponding camera adapter 110, can be adapted to a microscope, whereby a microscope system in accordance with one embodiment of the invention is formed. In this case, as mentioned repeatedly, a corresponding camera adapter 110 can also be embodied merely as a mechanical interface having no optical elements 111 that are present in the illustration in accordance with FIG. 1. Mechanical coupling means of the camera adapter 110 are configured for a mechanical coupling to the detection unit 10 and a microscope. The optical elements 111 of a corresponding camera adapter 110 can in particular also be integrated into a housing of a detection unit 10, which housing is illustrated here in a dashed manner in sections and in a non-connected way and is designated by 120. The camera adapter 110 can also be permanently coupled to the housing 120 or to a corresponding microscope.

The color beam splitter arrangement 100 illustrated in FIG. 1 comprises a first beam splitter prism 11, a second beam splitter prism 12 and a third beam splitter prism 13. In the example illustrated, the first beam splitter prism 11, the second beam splitter prism 12 and the third beam splitter prism 13 here are embodied in each case as Bauernfeind prisms. The corresponding angles between the individual prism surfaces are explained below.

The first beam splitter prism 11, the second beam splitter prism 12 and the third beam splitter prism 13 have in each case a first prism surface F1, a second prism surface F2 and a third prism surface F3. The first prism surface F1 and the second prism surface F2 here are arranged in each case at an acute first angle to one another. This angle is 30° in the example illustrated. The second prism surface F2 and the third prism surface F3 are arranged in each case at a right or obtuse second angle to one another, wherein the second angle is a right angle in the example illustrated. The third prism surface F3 and the first prism surface F1 here are oriented in each case at acute third angles to one another, wherein these angles are in each 60° in the example illustrated. The respective angles are prism interior angles between the first, second and respectively third prism surfaces F1, F2, F3 arranged in each case perpendicular to the plane of the drawing. The first, second and third prism surfaces F1, F2, F3 of each prism 11, 12, 13 by itself, and, in the configuration illustrated in FIG. 1, also the first, second and third prism surfaces F1, F2, F3 of all the prisms 11, 12, 13, here are perpendicular to a reference plane, which, in the illustration in FIG. 1, lies in the plane of the drawing or parallel thereto.

The first prism surfaces F1 are oriented in each case parallel to one another and at a right angle to a common optical axis A, which is illustrated here in a manner running in the plane of the drawing and offset slightly upward relative to its real position. The common optical axis A runs through the first prism surfaces F1 and the second prism surfaces F2 of the prisms 11, 12, 13 shown. The second prism surfaces F2 bear dichroic layers having specific cut-off wavelengths in each case in regions designated by 1, 2 and 3, respectively, which here are additionally illustrated with thickened lines. In the example illustrated, the cut-off wavelength of the dichroic layer 1 is approximately 490 nm, for example. The cut-off wavelength of the dichroic layer 2 is approximately 565 nm, for example. The cut-off wavelength of the dichroic layer 3 is approximately 650 nm, for example. The dichroic layers 1, 2, 3 are thus long-pass filters.

The first beam splitter prism 11, the second beam splitter prism 12 and the third beam splitter prism 13 are each assigned a prismatic compensation element. In the example illustrated here, the compensation elements are embodied as individual compensation prisms and designated by 21, 22 and 23. The compensation prisms 21, 22, 23 in each case likewise have a first prism surface F1' and a second prism surface F2'.

The first prism surfaces F1' of the compensation prisms 21, 22, 23 are likewise oriented parallel to one another and perpendicular to the common optical axis A. A distance between the respective first prism surface F1' and the second prism surface F2' of the compensation prisms 21, 22, 23 is chosen, in particular, in such a way that, in combination with the respective size of the beam splitter prisms 11, 12, 13, which is different in accordance with the illustration in FIG. 1, the glass paths of the beam components respectively formed are identical or coordinated with one another in such a way that, for example, longitudinal chromatic aberrations of the optical elements 111 of the camera adapter 110 or of an optical system of the assigned microscope are compensated for. As thus already discussed, the beam splitter prisms 11, 12 and 13 can have different dimensions. Advantageously, the second prism surfaces F2' of the compensation prisms 21, 22, 23 and the second prism surfaces F2 of the beam splitter prisms 11, 12, 13 are in each case oriented parallel to one another and furthermore cemented to one another, in particular. As mentioned, however, air gaps can also be provided in each case.

With regard to the further features and advantages of the color beam splitter arrangement 100, reference should expressly be made to the explanations above. In particular, the housing 120 of the color beam splitter arrangement 100 has an input 121 configured for direct or indirect coupling to the microscope. The coupling can be effected, in particular, by way of the camera adapter 110 illustrated here or a corresponding purely mechanical unit. Furthermore, a corresponding housing has in particular a plurality of outputs 122, via which light components of light radiated into the color beam splitter arrangement 100 can be coupled out in each case. Cameras or detectors 130 can in each case be coupled to said outputs 122, such that they do not have to be part of the color beam splitter arrangement 100 themselves. The coupling can be effected for example via standard interfaces of a mechanical type, for example a so-called C-mount, which are merely indicated here, however. The cameras or detectors 130 here are arranged in each case in a defined longitudinal position relative to a detection plane 131, for example a surface of a detector chip. The different cameras or detectors 130 can detect corresponding spectral components of the light that is spectrally decomposed in the color beam splitter arrangement 100. The detection planes 131 can also be displaced upstream or downstream of the illustrated positions by means of corresponding focusing or fine setting, for example.

By means of the color beam splitter arrangement illustrated in FIG. 1, light in a plurality of wavelength ranges, illustrated here in the form of a beam L, which light is radiated into the color beam splitter arrangement 100 by way of the camera adapter 110 and the optical unit 111 thereof, for example, can be split into spectral components. For this purpose, the light of the beam L firstly enters the first beam splitter prism 11 via the first prism surface F1 thereof. A corresponding component of said light is reflected at the dichroic layer 1 and impinges, as illustrated in the form of a light beam L1, on the first prism surface F1 of said beam splitter prism 11, at which it can be reflected again, in particular by total internal reflection. The light component of the light beam L that is correspondingly coupled out passes through the third prism surface F3 of the first beam splitter prism 11 in the form of the light beam L1, emerges from the first beam splitter prism 11 and impinges on a corresponding camera or a corresponding detector 130.

A remaining spectral component of the light beam L passes through the dichroic layer 1, radiates through the compensation prism 21, emerges from the latter and, as illustrated in the form of a light beam L2, enters the second beam splitter prism 12 via the first prism surface F1 thereof. A component of the corresponding light, as furthermore illustrated in the form of a light beam L3, is once again coupled out spectrally selectively at the dichroic layer 2. The same correspondingly applies to the third beam splitter prism 13, as illustrated by light beams L4 and L5. Light that is not reflected at the corresponding dichroic layer 3 here passes through said dichroic layer and the assigned compensation prism 23 in the form of a light beam L6 and enters camera 130 shown on the right.

FIG. 2 illustrates a microscope system 200 in accordance with one embodiment of the invention having a color beam splitter arrangement 100, which is part of a detection unit 10, in a greatly simplified partial illustration. The detection unit 10 here is also referred to as "first" detection unit 10. The color beam splitter arrangement 100 and the camera adapter 110 have already been explained above and are illustrated here once again in a simplified manner. An illustration of the housing 120 and of its inputs and outputs 121, 122 and also the designation of the prism surfaces have been provided. Furthermore, only a light component which corresponds to the light beam L6 and which impinges on the camera illustrated here on the right has been illustrated. The color beam splitter arrangement 100 can be embodied like the color beam splitter arrangement 100 in accordance with FIG. 1 or in a deviating manner. FIG. 2 is not true to scale, and so the color beam splitter arrangement 100, in particular, can be made significantly smaller in comparison with the other components of the microscope system 200.

An objective 103, a splitter mirror 102, an illumination optical unit 101, a barrier filter 105 optionally present, a tube optical unit 106, for example a single tube lens, and a deflection mirror 107 optionally present are illustrated as components of the microscope system 200. An infinity beam path U is formed between the objective 103 and the tube optical unit 106. At the deflection mirror 107, the optical axis A in the example illustrated is bent toward the right in the plane of the drawing; if the deflection mirror 107 is absent, said optical axis continues downward and the further elements are oriented accordingly. The person skilled in the art chooses from these and further alternatives in particular depending on the available space. The objective 103 and the tube optical unit 106, as an optical system, essentially define the imaging properties of the microscope system 200, with which, as mentioned repeatedly, the camera adapter 110 and/or the color beam splitter arrangement 100 can be coordinated, for example for the purpose of compensating for remaining longitudinal chromatic aberrations.

Illumination light provided by means of a light source 141 is radiated onto a sample 104 or a specimen via the illumination optical unit 101. The light source can be a customary low-voltage or LED light source, the light from which can also be coupled in for example by means of optical waveguides. The light source together with the illumination optical unit 101 and the splitter mirror 102 forms a wide-field illumination system, which is designated here in its entirety by 140 and which areally illuminates an object plane 104 or a sample 104' arranged therein. The objective 103 here is also part of the wide-field illumination system 140 since it is used for radiating the illumination light into the sample 104' or into the object plane 140.

Light or fluorescent light reflected from the sample 104' in the object plane 104 is imaged through the objective 103 and the splitter mirror 102 via the tube optical unit 106 and the deflection mirror 107 into an intermediate image plane 108. If a barrier filter 105 is present, light components can already be filtered out here. The camera adapter 110 is configured to focus corresponding light into an image plane of the cameras or detectors 130. The observation light thus enters the color beam splitter arrangement in a convergent manner. The components mentioned, in particular the tube optical unit 106 and the optical elements 111 of the camera adapter 110, produce a wide-field detection system 150 distinguished in particular by the fact that in it no single or multiple pinhole stop is arranged in a plane that is conjugate with respect to the object plane. The objective 103 here is also part of the wide-field detection system 150 since it is used for collecting the light emitted by the sample 104' or from the object plane 140. The cameras or detectors 130 here are embodied as area detectors, in particular monochrome cameras.

Figure 3:
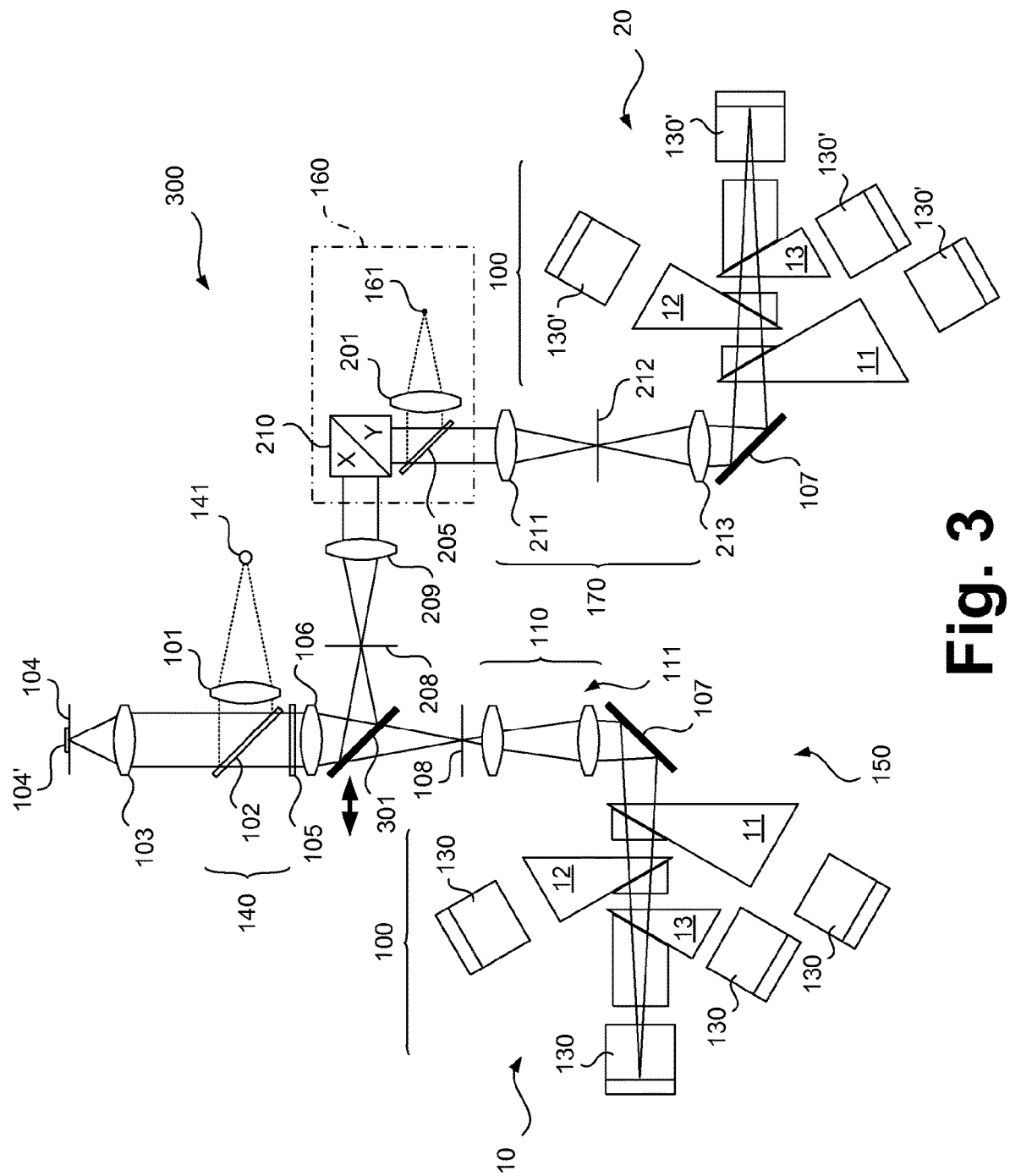
FIG. 3 illustrates a microscope having two detection units in accordance with one embodiment of the invention in a greatly simplified schematic partial illustration.

In FIG. 3, a microscope system in accordance with a further, particularly preferred, embodiment of the invention is illustrated and designated in its entirety by 300. In contrast to the microscope system 200 in accordance with FIG. 2, the microscope system 300 has two detection units 10, 20, namely a "first" detection unit 10 and a "second" detection unit 20. By means of a switchover mirror 301, which is switchable or displaceable in the direction of the arrow, light can be guided via corresponding beam paths optionally into the first detection unit 10 or into the second detection unit 20. In the snapshot shown in FIG. 3, light is guided into the second detection unit 20 via the switchover mirror 301 and is coupled out toward the right in the image plane at the switchover mirror. If the switchover mirror is not situated in the position illustrated, the light is further emitted downward.

As in the microscope system 200 in accordance with FIG. 2, the first detection unit 10 is linked to a wide-field detection system 150 or is part thereof. In contrast to the illustration in accordance with FIG. 2, here the beam path in the wide-field detection system 150, on account of the deviating arrangement of the deflection mirror 107, firstly runs downward and bends away toward the left in the plane of the drawing at the deflection mirror 107. Deviating configurations are possible here as well. A wide-field illumination system 140 is also present in the microscope system 300 in accordance with FIG. 3, like in the microscope system 200 in accordance with FIG. 2. Therefore, reference is expressly made to the explanations concerning FIG. 2.

In addition, however, a confocal illumination system designated here in its entirety by 160 is provided in the microscope system 300 in accordance with FIG. 3. The confocal illumination system 160 has a point light source 161. In the example illustrated, the point light source can be, in particular, a single pinhole stop, in the stop opening of which laser light is focused, or an end of an optical fiber from which light emerges in a punctiform fashion. The point light source 161 is conjugate with an intermediate image plane 208 and with the object plane 104, such that the illumination light of the confocal illumination system 160 is focused into the object plane 104 in a punctiform fashion.

Furthermore, an illumination optical unit 201, a splitter mirror 205 and an xy-scanning unit 210 are part of the confocal illumination system 160. By means of the illumination optical unit 201 and the splitter mirror 205, the illumination light of the point light source 161 can be coupled into the beam path. This typically involves fluorescence excitation light reflected at the splitter mirror 205, whereas light emitted by the sample 104' can pass through the splitter mirror 205 at least in part without being obstructed. By means of the xy-scanning unit 210, which, as mentioned, is advantageously situated in the telecentric plane or a plane that is conjugate therewith, the coupled-in light of the point light source 161 can be deflected in a manner known per se and its focal point in the object plane 104 can therefore be displaced laterally. In this way, scanning of the sample 104' in the object plane 104 is possible, as known in principle. A scanning eyepiece 209 is present as a further optical element, likewise known per se.

Light emitted by the sample 104' from the object plane 104, after it has radiated through the objective 103 and the tube optical unit 106, inter alia, enters the xy-scanning unit 210 via the scanning eyepiece 209 and therefore experiences a deflection in the opposite direction to the illumination light. It then passes through the splitter mirror 205 and is focused onto a single pinhole stop 212 (pinhole) via a pinhole optical unit 211. On account of the arrangement of the single pinhole stop 212 in a plane that is conjugate with respect to the object plane 104, substantially only the light from the object plane 104 can radiate through the single pinhole stop 212 and be radiated into the detection unit 20 via a detector optical unit 213 and a further deflection mirror 107. The pinhole optical unit 211, the single pinhole stop 212 and the detector optical unit 213 thus form a confocal detection system, which is designated by 170 in FIG. 3. In a departure from the illustration in FIG. 3, an optical waveguide can be arranged between the single pinhole stop 212 and the detector optical unit 213. The detection unit 20 can be equipped with point detectors 130' instead of typical cameras 130, which point detectors measure a light intensity only in a delimited region.

Insofar as a "wide-field illumination system", a "confocal illumination system", a "wide-field detection system" and a "confocal detection system" are mentioned in each case above, it goes without saying that the optical components designated in each case explicitly by the reference signs 140, 150, 160 and 170 in FIGS. 2 and 3 do not by themselves suffice in each case for corresponding illumination and detection, respectively, and further components illustrated are required, which however are not encompassed specifically by the reference signs 140, 150, 160 and 170, and which may optionally also be part of a plurality of corresponding systems. In all cases, the beam paths can be deflected arbitrarily by means of deflection mirrors 107.

Figure 4:
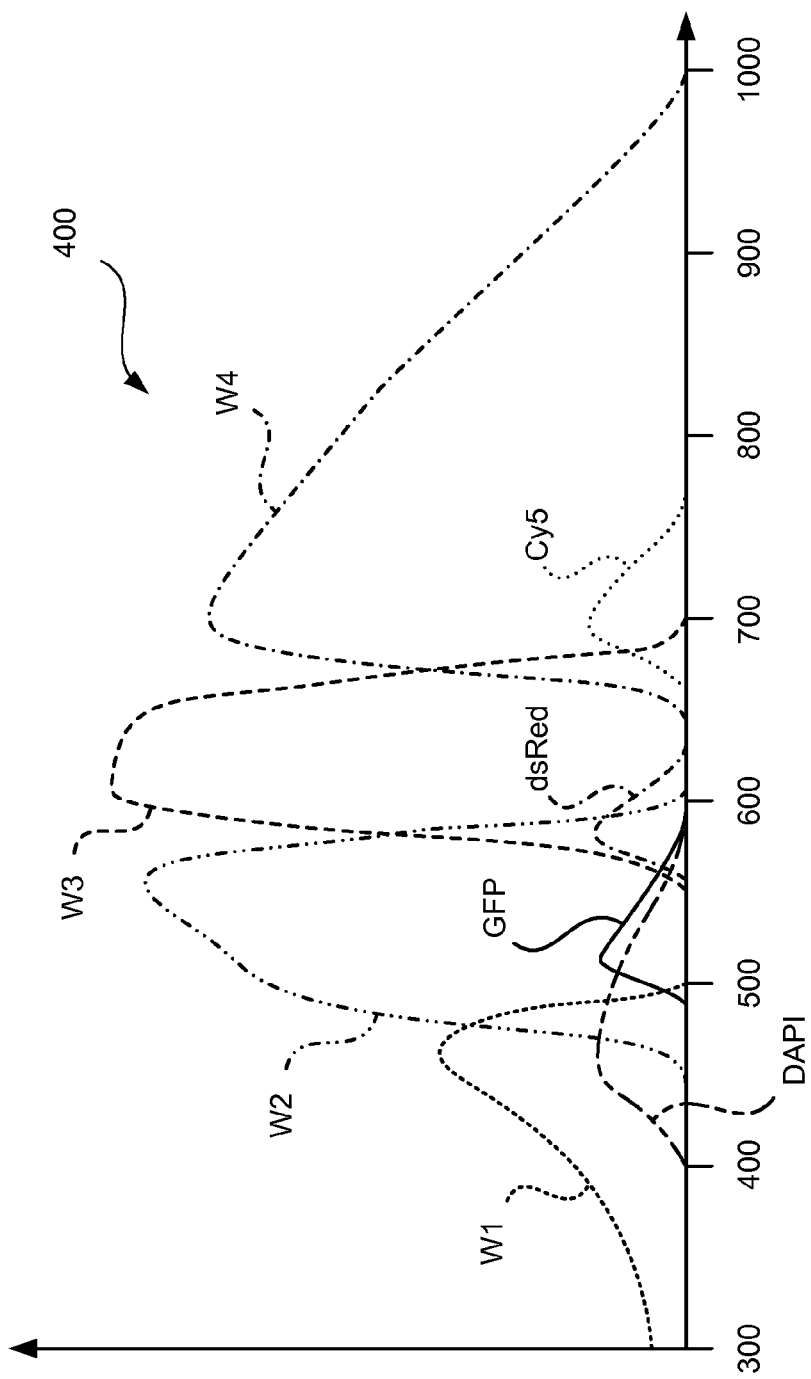
FIG. 4 illustrates color beam splitting in a microscope system having a detection unit in accordance with one embodiment of the invention in the form of a quantum efficiency diagram.

FIG. 4 illustrates beam splitting using a color beam splitter in accordance with one particularly preferred embodiment of the present invention in the form of a quantum efficiency diagram 400. In this case, a quantum efficiency is plotted on the ordinate versus a wavelength in nanometers on the abscissa.

W1, W2, W3 and W4 here illustrate wavelength components which can be detected by the different spectral channels of a corresponding color beam splitter arrangement. W1 denotes a blue channel, W2 denotes a green channel, W3 denotes an orange channel and W4 denotes a red channel. The spectra of various fluorescent dyes are designated by their respective abbreviations known to those skilled in the art.

Figure 5:
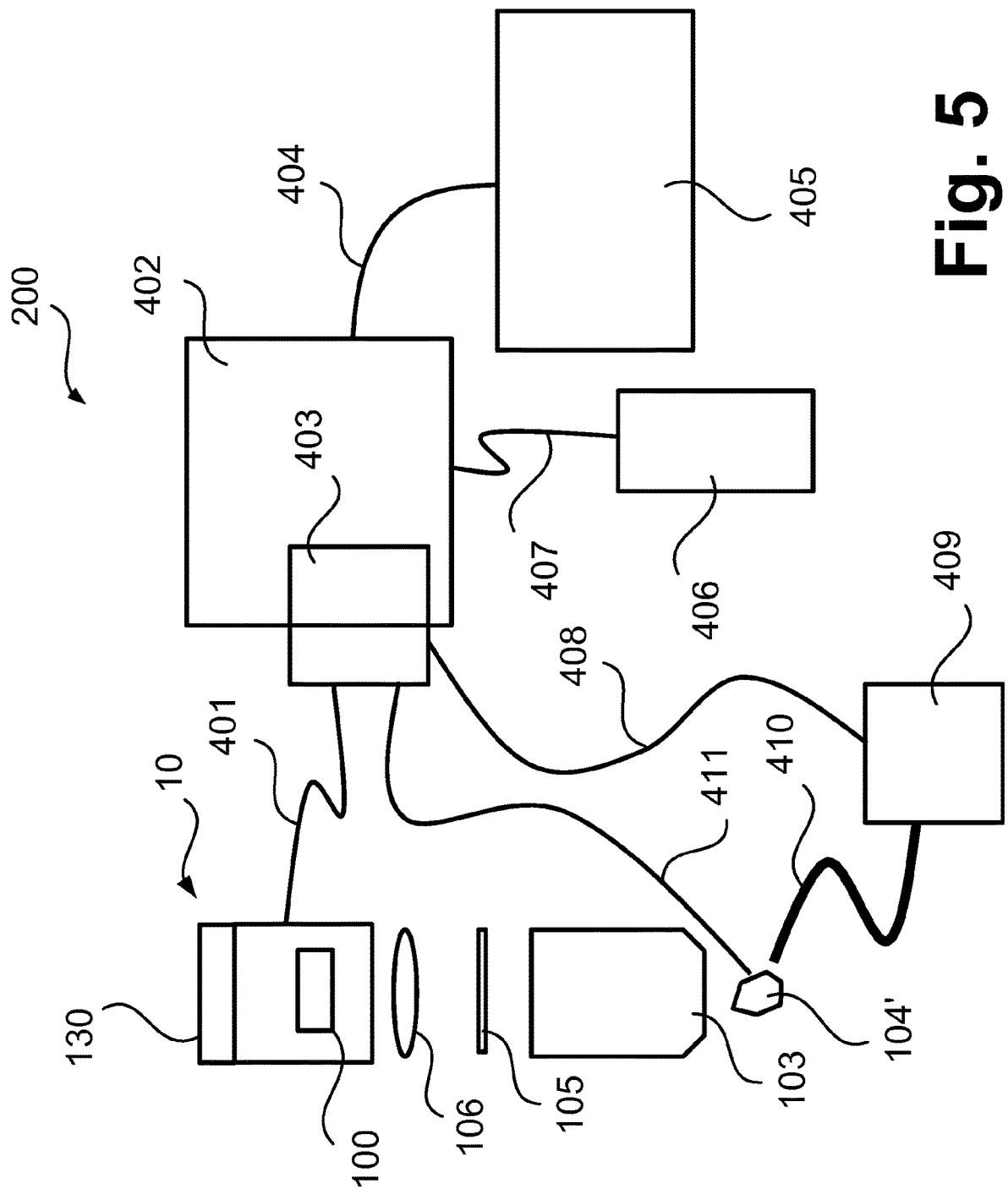
FIG. 5 illustrates a microscope system that is operable according to the invention in a greatly simplified schematic illustration.

In FIG. 5, a further microscope system, which is operable according to the invention or can be configured for carrying out a method according to the invention, is illustrated in a greatly simplified manner and is designated in its entirety, as previously in FIG. 2, by 200. The microscope system 200 comprises, as likewise illustrated in a greatly simplified manner here, a color beam splitter arrangement 100 such as has been explained above in various configurations. Said color beam splitter arrangement is illustrated as part of a detection unit 10 in FIG. 5, as previously.

In the example illustrated here, the detection unit 10 comprises a plurality of sensors or cameras such as have been already been explained above, and, depending on the configuration of the microscope system 200, any desired functional optical elements such as, in particular, bandpass filters and the like. A corresponding number of sensors or cameras can be present depending on the embodiment of the color beam splitter arrangement 100 and of the light components provided thereby. Said cameras or sensors, in the same way as image recording and/or evaluation devices that can be assigned to the sensors or cameras in the detection unit 10, are once again illustrated only in the form of a single camera 130 in FIG. 4, for reasons of clarity. Reference is made to the explanations above.

By means of the sensors or cameras 130 in the detection unit 10, digital image data can be obtained, in particular, which can be transmitted in particular via a data connection 401 from the detection unit 10 to a computing unit 402, for example a PC or a dedicated microscope controller. In this case, suitable software can be installed in the computing unit 402, by means of which software correspondingly obtained image data can be evaluated. It goes without saying that at least one portion of the image data obtained here can also be evaluated in hardware, for example in a graphics processing unit (GPU). Corresponding software can interact with the graphics processing unit, for example.

Via the same data connection 401 or a separate control line, control of the detection unit 10 or of its color beam splitter arrangement 100, but also of the sensors or cameras 130 can also be performed. A control unit 403 likewise implemented in terms of software and/or hardware is likewise used for this purpose.

In this case, the microscope system 200 can detect individual image data by means of the sensors of the detection unit 10, evaluate the individual image data and/or image data obtained using the individual image data by means of the computing unit 402, and perform control on the basis of the evaluation, as likewise explained in detail above.

As mentioned, by way of example, the sensors or cameras 130 of the detection unit 10 can be correspondingly controlled. By way of example, a gain factor at least of one of the sensors or of at least one of the cameras 130 or other parameters, e.g. a region of interest or parameters of a so-called pixel binning, can be set by means of a corresponding control unit 403. Corresponding sensors or cameras 130 can also be moved and/or exchanged in accordance with corresponding control.

Via a further data connection 404, a display device 405, for example a monitor, can be linked to the computing unit 402. The display device 405 can alternatively also be part of the computing unit 402 or be accommodated in a common housing with said computing unit. On the display device 405, a user can view the image data that were obtained by means of the sensors or cameras in the detection unit 10 and were processed in the computing unit 402. In this case, the processing of the image data in the computing unit 402 can comprise in particular a spectral segregation, a superimposition of image data from different spectral channels, in particular with respective intensity adaptation, and any desired measures known from the field of image processing. By way of example, the image data from specific or all color channels or a composite image can be subjected to a white or color balance, a zero value subtraction, a digital filtering, a normalization, a contrast compensation, a contrast increase, a sharpening or a segmentation.

On the basis of the image displayed on the display device 405, a user can alter parameters of the image processing and/or parameters of the control of the detection unit 10 via a user interface 406, which can be coupled to the computing unit 402 by way of a further data connection 407. As an alternative to such manual control, purely automatic control can also be provided, which changes corresponding parameters for example on the basis of stored rules, in particular in the form of look-up tables, characteristic curves and the like. Mixed forms of the control are also possible in the context of the present invention. The user interface 406, like the display device 405, can be part of the computing unit 402 or be accommodated in a common housing with said computing unit. The user interface 406 can have, in particular, known input means such as real or virtual keys. A mouse, a trackball, a tablet or other input means suitable in particular for manipulating image data can also be provided. The user interface 406 and the display device 405 can also be embodied at least partly as one device, for example in the form of a touchscreen.

By means of the control unit 403, in the embodiment of the microscope system 200 as illustrated in FIG. 4, an illumination unit 409 can also be controlled via a further data connection 408. In this case, the illumination unit 409 is designed in particular for providing illumination light in the form of fluorescence excitation light of one or a plurality of defined wavelengths or wavelength ranges. This illumination light can be provided in coherent or non-coherent form, in particular using modulatable light sources such as LEDs. However, the wavelengths or wavelength ranges can in particular also be selected by means of suitable, in particular changeable, filters or filter arrangements such as filter wheels, filter sliders, filter cubes and the like. The illumination unit 409 can comprise one or a plurality of light sources, each of which can supply mono- or polychromatic, linearly polarized, circularly polarized or unpolarized light. In the case of a plurality of light sources, the light thereof can in particular also be coupled into a common illumination beam path, for example by means of beam splitters or other input coupling devices. As illustrated in the example illustrated in FIG. 4, the light from one or a plurality of light sources can be radiated onto a sample, which is designated by 104' here as well, for example by means of a fiber-optic unit 410. Instead of the use of a fiber-optic unit 410, it is also possible to use traditional reflected-light or transmitted-light devices operating with partly transmissive elements, lenses, mirrors and the like, as shown above with reference to FIGS. 2 and 3. Adjustability of the position of the sample 104' can also be provided. Illumination units 140 and 160 such as have been explained above with reference to FIGS. 2 and 3, respectively, can also be provided in each case. These illumination units can also be controlled accordingly in configurations of the invention.

In particular, in the microscope system 200 illustrated in FIG. 4, provision can be made for carrying out adaptive control of the illumination device 409 depending on image data obtained by means of the detection unit 10 and evaluated in the computing unit 402. A targeted adaptation of illumination parameters, for example of the light intensity or of the selected wavelength, of one or a plurality of illumination units is able to be carried out in this way. Such an adaptation can be carried out manually, partly automatically or fully automatically. Particularly with the use of a plurality of fluorescent dyes which can be excited by different excitation wavelengths, in this way for example the different intensities can be matched to one another in order to prevent the image obtained from being swamped by a fluorescence channel. In other words, an intensity compensation between different fluorescence channels can likewise be achieved by means of an illumination adaptation. Since the amount of light radiated in here is only ever as much as is required for an optimum detection, in this way the sample can be treated with care and excessively rapid ageing can be prevented.

The position and orientation of the sample 104' can be adapted by means of a further data connection 411.

As further elements of the microscope system 200, which moreover can have all known elements of a (fluorescence) microscope system, an objective 103, a barrier filter 105 embodied as a multi-bandpass filter, in particular, and a tube optical unit 103 are illustrated, which are indicated by the same reference signs as the corresponding elements in accordance with FIG. 2.

It goes without saying that all of the data connections mentioned and all further data connections which can be used in a microscope system 200 of the configurations shown or of other configurations can be realized in the form of mono- or bidirectional data connections and in a wired or wireless manner, for example in the form of Wi-Fi, Bluetooth, infrared or other known remote transmission techniques.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10, 20 Detection unit
100 Color beam splitter arrangement
110 Camera adapter
111 Optical elements in camera adapter
120 Housing
121 Input of housing
122 Output of housing
130, 130' Camera, detector
131 Detection plane
200, 300 Microscope system
11, 12, 13 First, second, third beam splitter prism
1, 2, 3 First, second, third dichroic layer
F1, F2, F3 First, second, third prism surface at the beam splitter prism
21, 22, 23 First, second, third compensation prism
F1', F2' First, second prism surface at the compensation prism
A Optical axis
U Infinity beam path
L, L1-L6 Light beams, partial beams
101, 201 Illumination optical unit
102, 205 Splitter mirror
103 Objective
104 Object plane
104' Object
105 Barrier filter
106 Tube optical unit
107 Deflection mirror
108, 208 Intermediate image
140 Wide-field illumination system
141 Light source
150 Wide-field detection system
160 Confocal illumination system
161 Point light source
170 Confocal detection system
209 Scanning eyepiece
210 xy-scanning unit
211 Pinhole optical unit 212 Single pinhole stop
213 Detector optical unit
300 Quantum efficiency diagram
301 Switchover mirror
W1-W4 Quantum efficiencies of color channels
402 Computing unit
403 Control unit
405 Display device
406 User interface
409 Illumination unit
410 Fiber-optic unit
401, 404, 407, 408, 411 Data connection

The invention claimed is:

1. A microscope system comprising:
a first detection unit, or a plurality of detection units comprising the first detection unit and at least one second detection unit, wherein the first detection unit or at least one of the plurality of detection units has a color beam splitter arrangement having three beam splitter prisms, each of the three beam splitter prisms having a first, a second and a third prism surface, and a dichroic layer disposed on or parallel to each of the second prism surfaces of the beam splitter prisms,
wherein the first prism surfaces of the three beam splitter prisms face in the same direction and are oriented parallel to one another at a right angle to an optical axis through the first and second prism surfaces of the three beam splitter prisms,
wherein the first and second prism surfaces of the three beam splitter prisms are oriented in each case at acute first angles to one another, wherein the second and third prism surfaces of the three beam splitter prisms are oriented in each case at right or obtuse second angles to one another, and wherein the third and first prism surfaces of the three beam splitter prisms are oriented in each case at acute third angles to one another, and
wherein a prismatic compensation element having a first compensation element prism surface and a second compensation element prism surface is assigned to each of the three beam splitter prisms, wherein the second compensation element prism surface of each of the compensation elements is arranged in a common plane with or parallel to the second prism surface of the respectively assigned beam splitter prism.

2. The microscope system as claimed in claim 1, further comprising an objective and a tube optical unit arranged on an image side of the objective, wherein an infinity beam path is formed between the objective and the tube optical unit, wherein the tube optical unit is configured to focus light from the infinity beam path into an image plane, which is arranged on the image side of the tube optical unit and is conjugate with respect to an object plane.

3. The microscope system as claimed in claim 2, further comprising a wide-field illumination system and a wide-field detection system for areal illumination and detection of a region of the object plane.

4. The microscope system as claimed in claim 3, wherein the wide-field illumination system has a splitter mirror arranged in the infinity beam path, the splitter mirror being arranged to couple light from a light source into the infinity beam path between the objective and the tube optical unit or into a further infinity beam path.

5. The microscope system as claimed in claim 1, further comprising a confocal illumination system and a confocal detection system for punctiform scanning of a region of an object plane.

6. The microscope system as claimed in claim 5, wherein the confocal illumination system has a point light source in a plane that is conjugate with respect to the object plane and an image plane, and wherein the confocal detection system has a pinhole stop in the plane that is conjugate with respect to the object plane and the image plane or a further plane that is conjugate with respect to the object plane and the image plane.

7. The microscope system as claimed in claim 5, wherein the confocal illumination system has a scanning device configured to deflect illumination light.

8. The microscope system as claimed in claim 5, comprising the plurality of detection units comprising the first detection unit and the at least one second detection unit, of which the first detection unit is assigned to a wide-field detection system and the at least one second detection unit is assigned to the confocal detection system.

9. The microscope system as claimed in claim 5, further comprising a switchover mirror arrangeable in two positions disposed on an image side of the tube optical unit, wherein light is radiated into a wide-field detection system in a first position of the switchover mirror and light is radiated into the confocal detection system in a second position of the switchover mirror.

10. The microscope system as claimed in claim 1, wherein the first angles of the three beam splitter prisms have identical angle magnitudes, the second angles of the three beam splitter prisms have identical angle magnitudes and the third angles of the three beam splitter prisms have identical angle magnitudes.

11. The microscope system as claimed in claim 10, wherein the first angles are in each case 30°, the second angles are in each case 90° and the third angles are in each case 60°, or wherein the first angles are in each case 22.5°, the second angles are in each case 112.5° and the third angles are in each case 45°.

12. The microscope system as claimed in claim 1, wherein the three beam splitter prisms are embodied in each case as Bauernfeind prisms having identical prism angles.

13. The microscope system as claimed in claim 1, wherein the three beam splitter prisms have mutually different volumes.

14. The microscope system as claimed in claim 1, wherein the first detection unit or each of the plurality of detection units comprises a housing having an input, which is releasable from a detection output of a microscope without tools.

15. The microscope system as claimed in claim 1, wherein the three beam splitter prisms of the first detection unit or of each of the plurality of detection units comprise a first, a second and a third beam splitter prism, wherein the optical axis enters the beam splitter arrangement perpendicular to the first prism surface of the first beam splitter prism and emerges from the beam splitter arrangement perpendicular to the first compensation element prism surface of the compensation element assigned to the third beam splitter prism, wherein multichromatic light that is radiated into the beam splitter arrangement along the optical axis is decomposed into spectral components by the dichroic layers, wherein one of the spectral components is radiated out of the beam splitter arrangement via the first compensation element prism surface of the compensation element assigned to the third beam splitter prism, and wherein further spectral components of the spectral components are radiated out of the beam splitter arrangement in each case via the third prism surfaces of the first, second and third beam splitter prisms.

16. The microscope system as claimed in claim 15, wherein in the first detection unit or in each of the plurality of detection units in each case an output for fitting a detector and/or a detector are/is disposed respectively downstream of the first compensation element prism surface of the compensation element assigned to the third beam splitter prism and of the third prism surfaces of the three beam splitter prisms.

17. The microscope system as claimed in claim 1, wherein the compensation elements are embodied in such a way that the spectral components of the multichromatic light in the color beam splitter arrangement traverse in each case glass paths whose lengths differ by not more than a predetermined magnitude.

18. A method for microscopic imaging using the microscope system as claimed in claim 1, the method comprising radiating, using the microscope system, multichromatic light into the first detection unit or in each case into one of the plurality of detection units, wherein the multichromatic light is decomposed into different spectral components, and wherein the spectral components are detected in each case by detectors.

19. The method as claimed in claim 18, wherein the microscope system has a wide-field illumination system and a wide-field detection system for areal illumination and detection of a region of the object plane, and also a confocal illumination system and a confocal detection system for punctiform scanning of a region of the object plane, wherein the method comprises switching between a wide-field operating mode and a confocal operating mode in accordance with a user stipulation.

20. The method as claimed in claim 18, wherein the different spectral components detected by the detectors are processed at least partly by means of a computing unit.

21. The method as claimed in claim 20, wherein the processing of the different spectral components comprises registration and superimposition of at least one portion of the different spectral components.

22. The method as claimed in claim 21, wherein position deviation data are provided for at least one portion of the different spectral components and are used for the registration.

23. The method as claimed in claim 20, wherein the processing of the different spectral components comprises a data evaluation.

24. The method as claimed in claim 23, wherein one or a plurality of detection and/or illumination parameters of the microscope system and/or one or a plurality of detection parameters of at least one of the detectors are set on the basis of the data evaluation.

25. The method as claimed in claim 20, wherein the processing of the different spectral components comprises a spectral segregation.

26. The method as claimed in claim 25, wherein the different spectral components are detected in a form of pixel data and/or wherein the processing comprises generating pixel data, wherein a content of one or more pixels, the spectrum of which is brought about only by contribution of exactly one fluorophore, is determined in the pixel data and used as a reference value for the spectral segregation.

* * * * *